(12) United States Patent
Fernandes et al.

(10) Patent No.: US 7,028,897 B2
(45) Date of Patent: Apr. 18, 2006

(54) ADAPTOR FOR MAGNETIC STRIPE CARD READER

(75) Inventors: Jorge M. Fernandes, Los Altos Hills, CA (US); Mohammad A. Khan, San Jose, CA (US); Kerry D. Brown, Los Altos Hills, CA (US)

(73) Assignee: VIVOtech, Inc., Santa Clara, CA (US)

( * ) Notice: Subject to any disclaimer, the term of this patent is extended or adjusted under 35 U.S.C. 154(b) by 8 days.

(21) Appl. No.: 10/327,638

(22) Filed: Dec. 19, 2002

(65) Prior Publication Data

US 2004/0094624 A1    May 20, 2004

Related U.S. Application Data

(63) Continuation-in-part of application No. 10/306,618, filed on Nov. 27, 2002.

(60) Provisional application No. 60/411,536, filed on Sep. 17, 2002, provisional application No. 60/382,280, filed on May 20, 2002, provisional application No. 60/345,985, filed on Dec. 31, 2001, provisional application No. 60/343,874, filed on Dec. 26, 2001.

(51) Int. Cl.
*G06K 7/08* (2006.01)

(52) U.S. Cl. .................. 235/449; 235/450; 235/487

(58) Field of Classification Search ............. 235/380, 235/440, 449, 450, 487, 493
See application file for complete search history.

(56) References Cited

U.S. PATENT DOCUMENTS

| | | | |
|---|---|---|---|
| 4,575,621 | A | 3/1986 | Dreifus |
| 4,701,601 | A | 10/1987 | Francini et al. |
| 4,758,714 | A | 7/1988 | Carlson et al. |
| 4,788,420 | A | * 11/1988 | Chang et al. ............... 235/483 |
| 4,973,828 | A | 11/1990 | Naruse et al. |
| 5,157,247 | A | 10/1992 | Takahira |
| 5,266,789 | A | * 11/1993 | Anglin et al. ............... 235/483 |
| 5,276,311 | A | 1/1994 | Hennige |
| 5,530,232 | A | 6/1996 | Taylor |
| 5,590,038 | A | 12/1996 | Pitroda |
| 5,594,233 | A | 1/1997 | Kenneth et al. |
| 5,679,945 | A | 10/1997 | Renner et al. |
| 5,850,077 | A | 12/1998 | Tognazzini |
| 5,859,419 | A | 1/1999 | Wynn |
| 5,955,961 | A | 9/1999 | Wallerstein |

(Continued)

FOREIGN PATENT DOCUMENTS

EP    0 863 477 A1    9/1998

(Continued)

OTHER PUBLICATIONS

S. Petri, An Introduction to Smart Cards, Litronic, Inc., Messaging Magazine, 1999, pp. 1-12.

*Primary Examiner*—Steven S. Paik
(74) *Attorney, Agent, or Firm*—Townsend and Townsend and Crew LLP

(57) ABSTRACT

An adaptor allows a magnetic stripe card reader to receive information from other media such as wireless proximity chip cards while maintaining the ability to receive a magnetic stripe card. In accordance with one embodiment, the adaptor includes a simulacrum structure of sufficiently narrow width to fit substantially permanently within the slot of the magnetic stripe reading device, while providing sufficient room for a magnetic stripe card to also be concurrently accommodated within the slot and read by the reader head. The simulacrum structure may be in electronic communication with one or more transceivers of wireless communications such as RF and IR.

21 Claims, 16 Drawing Sheets

U.S. PATENT DOCUMENTS

| | | |
|---|---|---|
| 5,991,410 A | 11/1999 | Albert et al. |
| 6,131,811 A | 10/2000 | Gangi |
| 6,141,161 A * | 10/2000 | Sato et al. .................... 360/2 |
| 6,175,922 B1 | 1/2001 | Wang |
| 6,206,293 B1 | 3/2001 | Gutman et al. |
| 6,293,462 B1 | 9/2001 | Gangi |
| 6,446,864 B1 * | 9/2002 | Kim et al. .................. 235/382 |
| 6,769,607 B1 * | 8/2004 | Pitroda et al. .............. 235/380 |

FOREIGN PATENT DOCUMENTS

| | | |
|---|---|---|
| EP | 1 104 909 A1 | 6/2001 |
| WO | WO 01/37199 A1 | 5/2001 |
| WO | WO 01/37200 A1 | 5/2001 |

\* cited by examiner

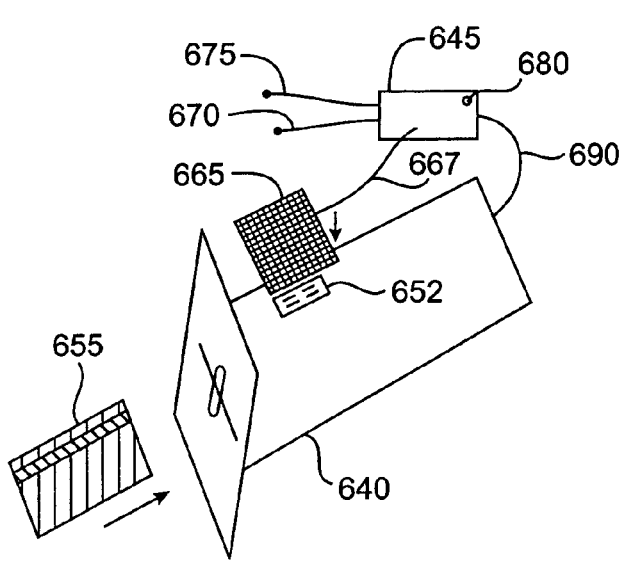 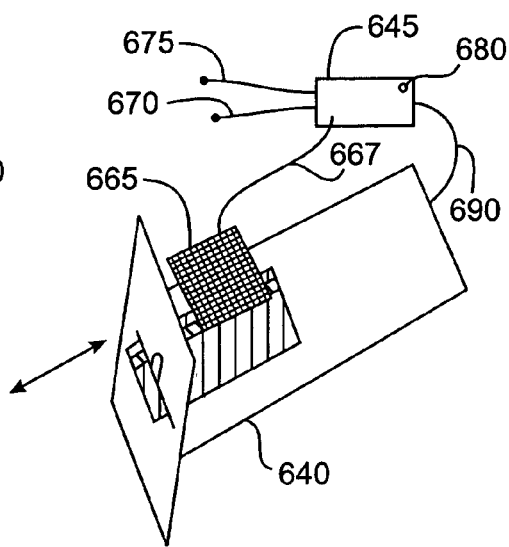
FIG. 7A  FIG. 7B
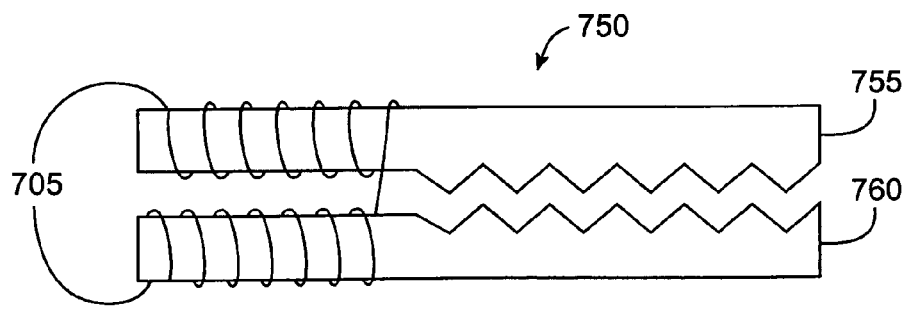
FIG. 8

ADAPTOR FOR MAGNETIC STRIPE CARD READER

CROSS-REFERENCES TO RELATED APPLICATIONS

The instant nonprovisional patent application is a continuation-in-part of U.S. nonprovisional patent application Ser. No. 10/306,618, filed Nov. 27, 2002. The instant nonprovisional patent application also claims priority from the following provisional patent applications, which are hereby incorporated by reference for all purposes: U.S. provisional patent application No. 60/343,874, filed Dec. 26, 2001, U.S. provisional patent application No. 60/345,985, filed Dec. 31, 2001, U.S. provisional patent application No. 60/382,280 filed May, 20, 2002, and U.S. provisional patent application No. 60/411,536 filed Sep. 17, 2002.

BACKGROUND OF THE INVENTION

The concept of magnetic stripe credit cards was generally embraced by merchants and consumers when standards were adopted by the industry in the 1970's. The International Airline Transport Association (IATA) and the American Banking Association (ABA) defined the standards for magnetic domain encoding for tracks 1 and 2, respectively, of magnetic stripe cards. A third track of magnetic stripe cards is still used by some organizations such as ATM machines for read and write functions, and utilizes unique organization encoding schemes. The International Standards Organization (ISO/IEC 7811) established standards for the architectural design and acceptable materials composition of magnetic stripe cards.

Electronic/computer "RF proximity chip cards" introduced in the late 1980s were originally used for applications such as inventory control. ISO standards 15693 and 14443, sub type A and B, typically define such characteristics of RF proximity chip cards that include operational frequencies, electromagnetic coupling distance, and data integrity. These RF proximity chip cards have now increased in popularity for use with employee access to secure areas such as office buildings. The RF proximity chip cards typically receive power for on-card electronic functions via an induced electromagnetic field held within about 10 cm of the communications transceiver. Data is typically transferred to the on-card chip via electromagnetic sub-carriers and switching of the electromagnetic field.

The integrated circuits resident within these RF proximity chip cards have continued to improve with low power and the addition of cryptographical functions that now meet government "strong" encryption standards (DES, RSA, etc.) as standardized by Europay Mastercard and Visa (EMV) cryptographic and tamper-proof standards for crytoprocessor chips. As a result, the RF proximity chip cards are slowly replacing the magnetic stripe card for use in financial transactions, primarily due to the security of the magnetic stripe user data and the ability of the POS card acceptance system to "interrogate" the RF proximity chip card. The lower fraudulent transactions associated with such a smart card results in lower risk, and lower fees for the consumer and merchant.

Even more recently, the increased speed and reduced size of electronic devices has resulted in the proliferation of powerful and portable personal trusted devices, or PTDs. Mobile PTDs including the personal digital assistant (PDA) and cellular phone now number in the millions worldwide. The ability of these PTDs to communicate via cellular and wireless ISP networks has been augmented by their ability to exchange data over short ranges, typically 1 mm–10 meters, for purposes of secure data sharing between PTD devices and such peripheral devices as printers. These short-range networks are typically referred to as personal area networks (PAN). One predominant short-range RF communications network standard, defined by the International Electrical and Electronic Engineers association (IEEE), is known as the IEEE 802.11(b) standard, and includes such protocols as BLUETOOTH. Other RF communications protocols include but are not limited to IEEE 802.11(a) and 802.11(g). A major short-range infra-red (IR) communications network protocol, defined by the Infra-red Device Association (IrDA), is known as the IrDA standard and their present specification is IrDA v1.2.

The variety of functions available to PTDs is increasing rapidly, for example with remote banking being popularized via the internet and telephone ordering. Many merchants are now able to use mobile transaction processing systems with cellular wireless ISP networks providing bank access and such support functions as consumer authentication, transaction authorization, event logging, and settlement. Consumers are now able to access and effect personal account maintenance functions via bank websites and similar portals.

Despite this advancement, there remain 21 million worldwide merchants having only magnetic stripe card acceptance systems. Many of these merchants obtained their magnetic stripe card acceptance system years ago, and are resistant towards replacing their equipment and undergoing training in the use of newer systems. As a result, most new financial card equipment sales are merely replacement models. Upgrades to new equipment, including merchant systems capable of reading the RF proximity chip cards, is primarily driven by head offices of franchise or branch retail stores desiring to improve inventory, financial accounting, and similar functions, who may not necessarily exert influence over individual, independent merchants. Yet another barrier to adopting technology for RF proximity chip card transactions is that manufacturers of magnetic stripe card acceptance systems may disqualify any attempt to upgrade their devices through direct modification of electrical connections, thereby discouraging upgrades by third party equipment suppliers.

A problem thus exists whereby the technology for more secure consumer/user financial data storage and transactions is available, but is compromised by a reluctance of merchants to replace their existing POS card acceptance systems. Therefore, it can be seen that there is a need in the art for devices and methods which enable older legacy POS card acceptance systems to be non-invasively adapted to interact with various newer technology PTD devices to meet the desires of the transaction industry, and the desires of the merchants

BRIEF SUMMARY OF THE INVENTION

An adaptor in accordance with the present invention allows a conventional magnetic stripe card POS reader to receive information from contact-based or wireless sources while maintaining the concurrent ability of the reader to interact with a magnetic stripe card. In accordance with one embodiment of the present invention, the adaptor includes a simulacrum structure of sufficiently narrow width to fit substantially permanently within the slot of the magnetic stripe reading device, while providing enough room for a magnetic stripe card to also be accommodated within the slot. The simulacrum structure is in electronic communication with one or more transceivers of wireless communications such as RF and IR. Signals from the transceivers are translated into corresponding electrical pulses in a magnetic stripe format. An inductor of the simulacrum is aligned with the magnetic head, and in response to the electrical pulses generates a magnetic field that can be sensed by the magnetic head. In an alternative embodiment, the simulacrum occupies the entire slot and a second magnetic stripe card slot and reader head are provided in communication with the simulacrum in order to maintain concurrent access to the reader by a magnetic stripe card.

An embodiment of a method for importing information from a magnetic stripe card into a personal trusted device in accordance with the present invention comprises providing an adaptor structure comprising a transceiver configured to transmit a signal to a personal trusted device, a memory in communication with the transceiver, and a simulacrum disposed within a slot of a magnetic stripe card reader and in magnetic communication with a magnetic reader head of the magnetic stripe card reader. Information is read from a magnetic stripe card, and the information is stored in the memory. The information is communicated to the personal trusted device.

An embodiment of a method for disabling a magnetic stripe card in accordance with the present invention comprises providing a magnetic stripe card reader having a slot and a magnetic head in magnetic communication with the slot. An adaptor structure comprising a transceiver configured to transmit a signal to a personal trusted device, a memory in communication with the transceiver, and a simulacrum including an inductor is provided. The simulacrum is disposed substantially permanently within the slot such that the inductor is aligned with the magnetic reader head, the simulacrum sufficiently narrow to allow a magnetic stripe card to access the slot and the magnetic head while the simulacrum is present within the slot. A magnetic stripe card is swiped through the slot such that information on the magnetic stripe card is read by the magnetic head. The information is communicated to a remote data repository. A signal is received from the remote data repository indicating invalidity of the magnetic stripe card. The signal is communicated to the adaptor. In response to the signal, the inductor is caused to generate an electromagnetic field of sufficient strength to alter at least one bit of data stored on a magnetic stripe of the magnetic stripe card.

An embodiment of a method for communicating information to a PTD comprises providing a magnetic stripe card reader having a slot and a magnetic head in magnetic communication with the slot. An adaptor structure is provided comprising a transceiver configured to receive a first signal from a source and to transmit a second signal to a personal trusted device, and a memory in communication with the transceiver. Information received at the transceiver is communicated from the source to the memory. The information is stored in the memory. The information is transmitted from the memory to the personal trusted device utilizing the transceiver.

A further understanding of the embodiments of the present invention can be made by way of reference to the ensuing detailed description taken in conjunction with the accompanying drawings.

BRIEF DESCRIPTION OF THE DRAWINGS

FIGS. 7A–B show simplified perspective views of another alternative embodiment of an adaptor structure in accordance with the present invention.

FIG. 8 shows a perspective view an alternative embodiment of an inductor structure for longitudinal indexing in accordance with the present invention.

DETAILED DESCRIPTION OF THE INVENTION

I. Adaptor Structure and Function

An adaptor in accordance with the present invention allows a conventional magnetic stripe card reader to interact with other media such as RF proximity chip cards and Infra-Red while retaining the continuous ability to receive a magnetic stripe card. In accordance with one embodiment, the adaptor includes a simulacrum structure of sufficiently narrow dimensions to fit substantially permanently within the slot of the magnetic stripe reading device, while providing sufficient room for a magnetic stripe card to also be accommodated with the slot. The simulacrum structure may be in electronic communication with one or more transceivers of wireless media such as RF and IR.

For purposes of the instant patent application, the term "substantially permanent" refers to affixing an adaptor to a conventional magnetic stripe card POS device for relatively long periods, such that the adaptor is not routinely removed to allow the use of a magnetic stripe card. Examples of substantially permanent installation of the adaptor include but are not limited to the use of gluing/adhesion, mechanical fasteners, plastic welding, wedge anchors, or other physical bonding techniques. Such substantially permanent installation allows the adaptor to function in conjunction with the existing magnetic stripe card reader without requiring invasive modification or alteration of the reader or its normal capabilities. Substantially permanent installation of an adaptor in accordance with an embodiment of the present invention is reversible, and under other than routine conditions the adaptor may be removed to allow inspection, repair, or replacement without damage to the existing magnetic stripe reader device.

Figure 1:
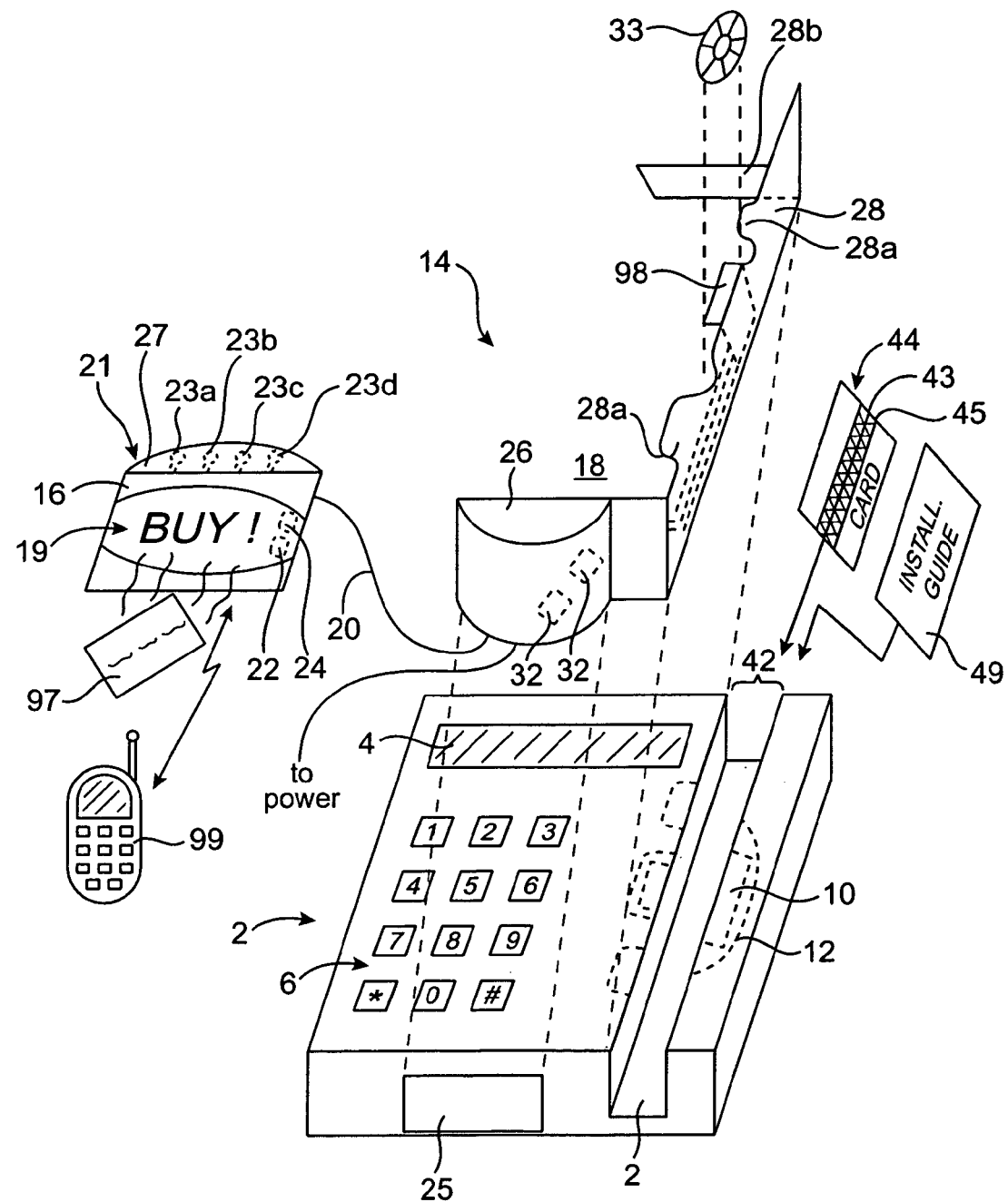
FIG. 1 shows a simplified exploded view of an adaptor system in accordance with one embodiment of the present invention.

FIG. 1 shows an exploded view of an adaptor system (hereafter also referred to as the "ViVOadapter") in accordance with one embodiment of the present invention. Conventional point-of-sale (POS) magnetic stripe card reader 2 features display 4, keypad 6, and magnetic card swipe slot 8. Magneto-inductive reader head 10 is flexibly supported by leaf spring 12 to project slightly into slot 8.

Adaptor 14 comprises consumer pod (C-Pod) portion 16 in electrical communication with merchant pod (M-Pod) portion 18 through cable 20. Consumer pod portion 16 is positioned at a location convenient for the customer, who may interact with the adaptor 14 by bringing an RF proximity chip card 97, PTD 99, or other RF or IR transceiver device in proximity to a wireless transceiver 22 to communicate information.

C-Pod portion 16 includes active region 19 proximate to an antenna for interacting at short range with an RF proximity chip card or other personal trusted device. Active region 19 may be of concave shape to cue a user as to the optimal position of the RF proximity chip card in front of the antenna. Particular embodiments of the C-Pod may bear an advertising logo on the active region 19 as generically indicated in FIG. 1. One possible design of a C-Pod structure in accordance with an embodiment of the present invention is depicted in U.S. Design Pat. application Ser. No. 29/168, 943, filed Oct. 10, 2002 which is incorporated by reference herein for all purposes.

C-Pod portion 16 may further include visual display region 21. In one embodiment, four discrete light emitting devices 23a–d are positioned behind translucent screen 27 of C-Pod portion 16 and then selectively lit to indicate progress of a particular transaction. For example, left-most lamp 23a may be continuously lit to indicate an active power connection. Lamps 23b and 23c may lit to indicate detection of the presence of an RF proximity chip card or other user device. Right-most lamp 23d may be lit to indicate completion of a successful transaction. Embodiments of C-pod portion 16 may also include apparatus for providing audio indicia of transaction progress, for example a speaker which emits a sound after successful completion of the transaction. Typical operation of video and audio indicia is further detailed below in connection with FIG. 12.

C-Pod portion 16 further comprises one or more transceivers 22 in communication with respective interface processors 24. One example of a transceiver which may be located in the consumer pod portion is an infrared (IR) transceiver supporting Irda v.1.2 and higher standards for inter-device bi-directional communications. This IR transceiver is of particular value for communicating with personal trusted devices (PTD) that may be carried by a consumer or user. Another example of a transceiver that may be located in the consumer pod portion is a radio frequency proximity transceiver conforming to the ISO 14443 type A or B standard or to the ISO 15693 standard. Still another example of a transceiver that may be located in the consumer pod portion is a transceiver conforming to the Bluetooth IEEE 802.11(b) standard, or the IEEE 802.11(a) and (g) standards. Yet another example of a transceiver that may be located in the C-Pod portion is a wireless transceiver configured for wireless or cellular protocols based upon CDMA, CDPD, GPRS, GSM, SMS and similar wireless communication protocols.

While the above description has focused on the presence of one or more wireless transceivers in the consumer pod portion of the adaptor, this is not required by the present invention. In alternative embodiments, the consumer pod portion could feature one or more contact-based interfaces for interacting with a consumer transaction card or smart card. One example of such a system is a modular-based docking port for a smart card. Other embodiments could include both wireless and contact-based transceivers.

In addition to the wireless or contact-based transceivers just described, an adapter in accordance with an embodiment of the present invention could further comprise one or more additional specialized interfaces. Examples of such additional interfaces include but are not limited to a keyboard permitting the entry of psychometric devices such as a personal identification number (PIN) pin pads, and SMS transfer of PIN, bio-metric devices such as finger print, iridology, voice print analyzers, driver's license identifications, or transconductance cards currently being developed, and devices for reading code sets such as bar codes, UPS-type 3-D codes, moiré-pattern codes, and drivers license magnetic strips and holograms, and SIM/WIM/IUIM subscription identifier chips typically used in cellular PTD devices. One or more of these interfaces, alone or in combination, could require additional verification or authentication of the user, thereby adding levels of security to the transaction.

While the above description has focused on the presence of separate and discreet consumer pod and merchant pods with interconnecting cable, this configuration is not required by the present invention. In alternative embodiments, the consumer pod portion could be integrated into the merchant pod portion, creating a complete and single-piece unit. One example of such a system preference would be for merchants with magnetic POS reader systems conveniently located on the transaction counter and within reach of the consumer's PTD. Alternate embodiments could include positioning the separate M-Pod and C-pod components remote from the simulacrum tape that is substantially permanently installed within the card acceptance system reader. Another alternate embodiment could include the positioning of a single piece integrated C-Pod and M-Pod device remote from the simulacrum tape substantially permanently installed within the card acceptance system reader.

As shown in FIG. 1, consumer pod portion 16 is in electrical communication with merchant pod portion 18 through cable 20, although in other possible embodiments the consumer pod and merchant pod could communicate according to infrared or another medium. Merchant pod 18 comprises module 26 in physical contact with the front of magnetic stripe card reader 2 through adapter plate 25. An example of one possible design of a module structure in accordance with an embodiment of the present invention is depicted in U.S. design patent application Ser. No. 29/170,080, filed Oct. 30, 2002 which is incorporated by reference herein for all purposes.

Figure 1A:
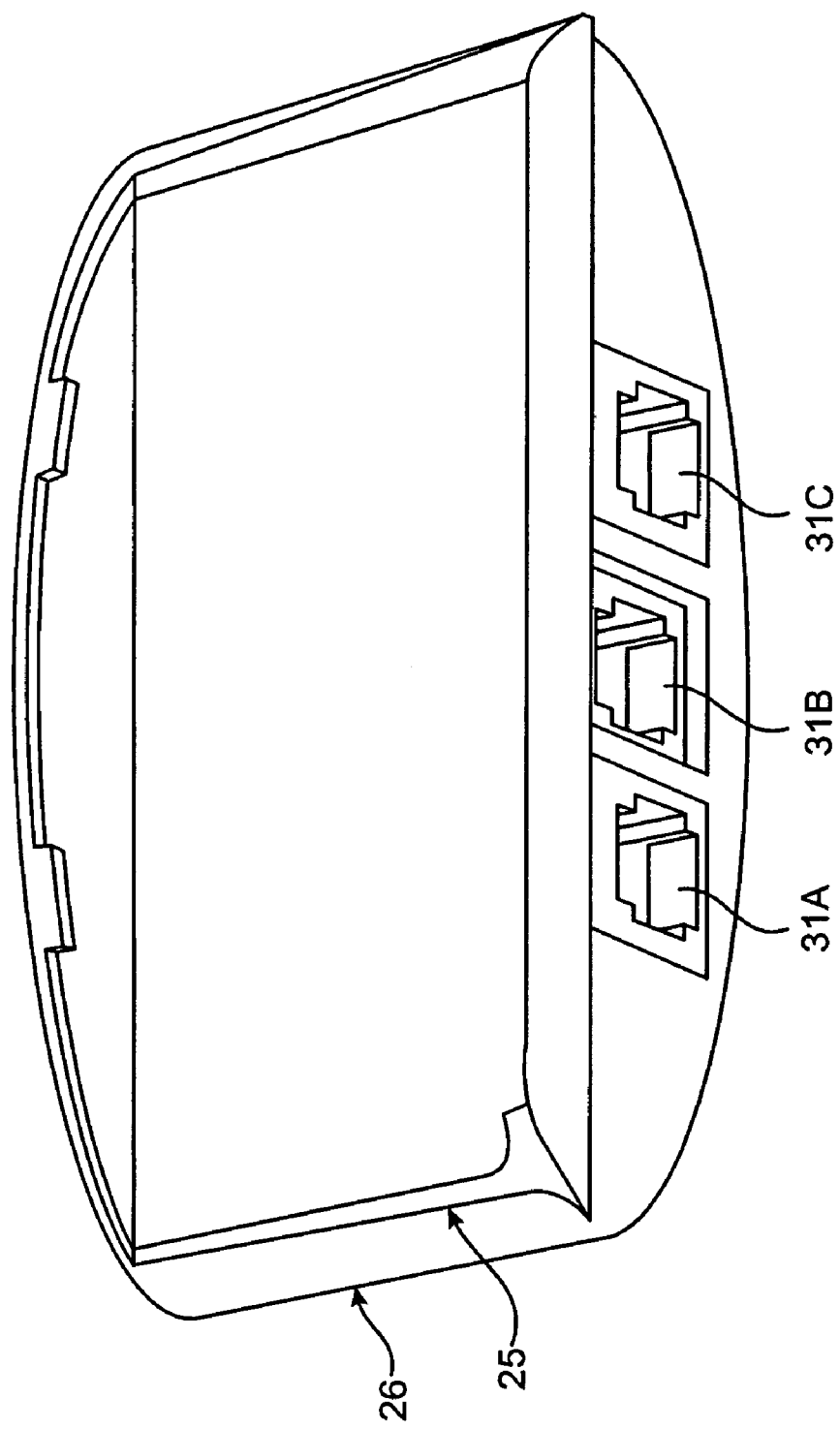
FIG. 1A shows a simplified enlarged view of the module underside of the embodiment shown in FIG. 1.

Module 26 is in electrical communication with simulacrum structure 28 positioned within slot 8 of magnetic stripe card reader 2. FIG. 1A shows an inverted, enlarged view of the underside of module 26 showing a number of ports for interfacing with other devices, including port 31*c* for receiving a power cord, port 31*a* for receiving a cable from the consumer pod portion, and communications port 31*b*. The presence of a communications port in the module allows for software upgrades to be implemented in the adaptor, for interface of the adaptor to existing POS systems and merchant networks, for interface to ViVOadapter networks, for interface to wired internet and telecommunications, for interface to vending machine product electromechanical activation and delivery devices/systems, for interface to a stand-alone CPU such as a PC, for peripheral devices that may include printers, displays, keyboards and for wired/wireless transceivers, and for expansion of the adaptor to accommodate devices employing communication utilizing alternative or not-yet-developed media or protocols. In addition to the ports just listed, module 26 of the merchant pod could include other types of ports, including but not limited to peripheral device communications, secondary authentication devices, other ViVOadapters and ViVOadapter networks, and input devices such as bar code scanners, authentication devices, and other code reading devices.

The M-Pod portion may include one or more wireless transceivers configured for wireless or cellular protocols based upon CDMA, CDPD, GPRS, GSM, SMS and similar wireless communication protocols. Module 26 also contains a number of chips including memories and processors responsible for controlling operation of the adaptor. Input/output handling microcontroller 30, shown in FIG. 5, allows the merchant or user to select the communication medium through which a user will interact with the adaptor. The input/output handling microcontroller 30 will also accept unique merchant or user codes and relevant data associated with the merchant/user for identification and non-repudiation schemes. Module 26 further includes security microcontroller 32 including a cryptoprocessor which executes stored cryptographic routines and standards including DES, RSA, DSA, HASH, and other communication standards, and has Public Key Infrastructure (PKI) and digital certificate software features for mutual device authentication, data integrity verification, and secure encryption communications with the user's PTD.

While the above description and figures illustrate an embodiment wherein the M-Pod and C-Pod components represent discrete structures connected by a cable, this is not required by the present invention. Alternative embodiments could incorporate the M-Pod and C-Pod components into a single housing located at the magnetic stripe card reader, or positioned remote from the magnetic stripe card reader and in communication with the simulacrum (discussed below) through a wire or wireless connection.

Figure 1B:
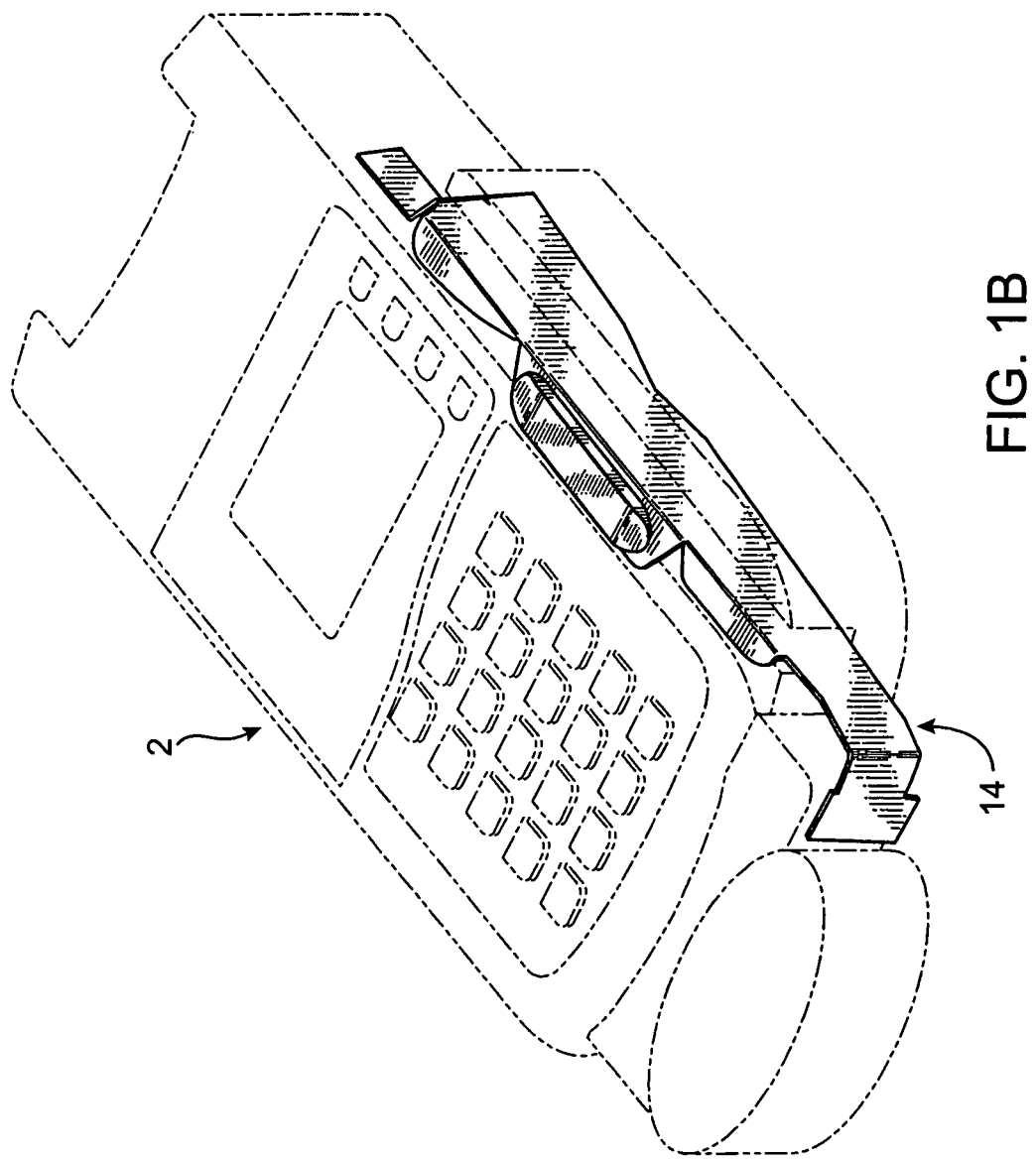
FIG. 1B shows a perspective view of a simulacrum in accordance with an embodiment in accordance with the present invention, as positioned in a POS magnetic stripe card reader.

As stated above, simulacrum 28 is in electronic communication with the module, and in electro-magnetic communication with the head of the magnetic stripe card reader. FIG. 1B shows a perspective view of a simulacrum 28 in accordance with an embodiment in accordance with the present invention, as positioned within a slot of a POS magnetic stripe card reader 2. One example of a design of a simulacrum structure in accordance with an embodiment of the present invention, which is compatible with an Omni 3200 magnetic stripe card reader, is depicted in U.S. design patent application No. 29/171,704, now granted as U.S. Design Pat. No. D491,186, filed Nov. 27, 2002, which is incorporated by reference herein for all purposes.

Figure 2:
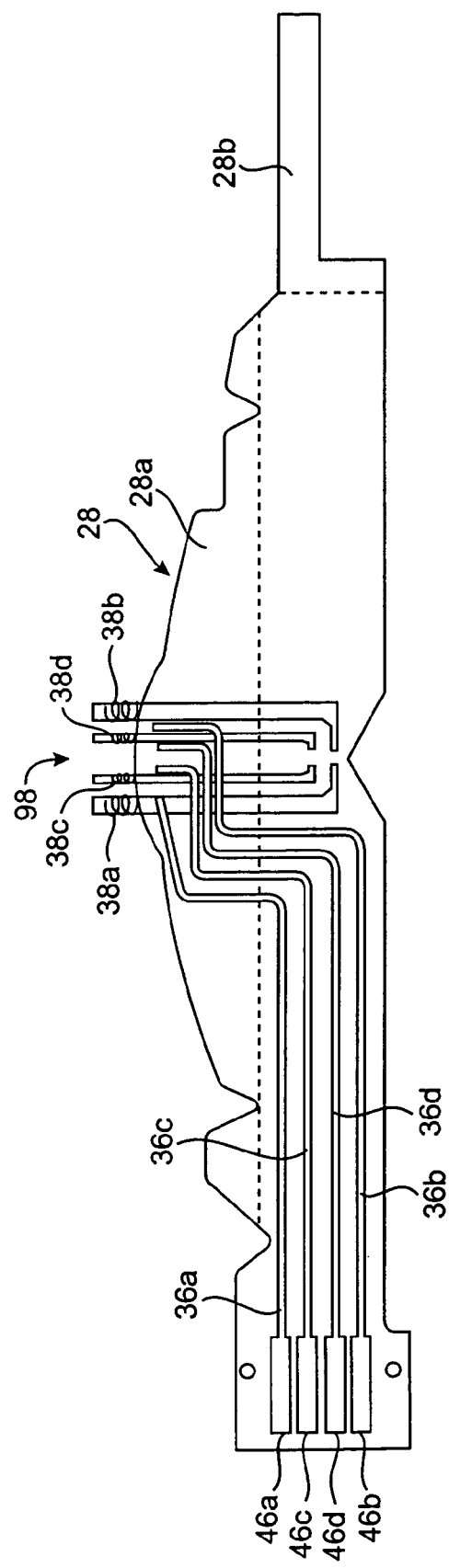
FIG. 2 shows a simplified enlarged side view of the simulacrum structure of FIG. 1.
Figure 3:
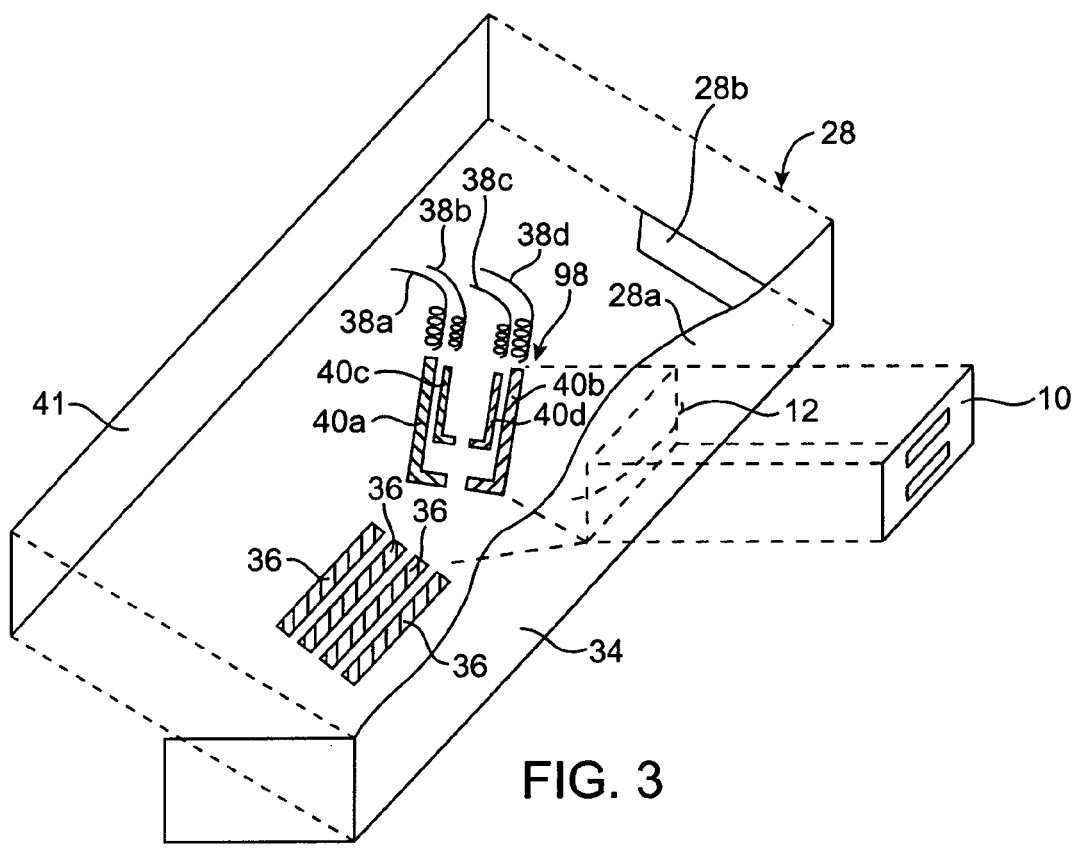
FIG. 3 shows a simplified exploded view of the simulacrum structure of FIGS. 1–2.

FIG. 2 shows a simplified enlarged side view of the simulacrum structure of FIG. 1, and FIG. 3 shows a simplified exploded view of the simulacrum structure of FIGS. 1–2. Simulacrum 28 comprises dielectric substrate 34 supporting electrically conducting traces 36 and coils 38 in electromagnetic communication with inductor core elements 40, thereby forming inductor structure 98. Substrate 34 may be formed from polycarbonate, as is available from General Electric Plastics of Bergen op Zoom, Holland, or some other deformable but sufficiently stiff material. Traces 36 and coils 38 are typically formed from copper or another conducting metal. Traces 36, coils 38, and inductor core elements 40 may be secured to substrate 34 by being sandwiched between the substrate and an overlying nonconducting film 41 such as Mylar®, available from Du Pont, of Wilmington, Del., or a polycarbonate film as described above.

Inductor core elements 40 may be formed from a variety of materials exhibiting desirable magnetic properties, including but not limited to ferromagnetic materials such as cobalt and alloys thereof. In accordance with one embodiment of the present invention, the inductor core elements comprises a cobalt alloy having an elemental composition of approximately 85% cobalt, 2% iron, 8% silicon, 4% manganese, and about 1% other materials. This material is obtained from Honeywell MetGlas Solutions of Conway, S.C. These percentages represent only an approximation of one particular embodiment, and alternative embodiments could employ other alloys having different compositions.

The materials comprising the cobalt alloy contribute various attributes to the inductor structure. For example, cobalt is a ferromagnetic material that is able to exhibit sufficiently strong electromagnetic fields in response to an induced field proportional to the applied voltage and current to the coils that encompasses the inductor core elements. The silicon contributes structural strength, and the manganese is useful for bonding purposes. The alloy of this particular embodiment is supplied by the manufacturer in a film having a thickness of approximately 0.001" in a tape 2.0" wide by 100 feet long.

During operation of the embodiment shown in FIG. 1, the M-Pod component of the ViVOadapter is placed directly adjacent to the POS card swipe reader device, with simulacrum 28 aligned to the magnetic reader head of the existing POS card reader system in such a manner as to maintain continued access to the swipe or insert slot for normal card-reading functions. Specifically, simulacrum 28 is positioned within magnetic swipe slot 8 on the side opposite to magnetic reading head 10, such that gap 42 is defined between simulacrum 28 and magnetic head 10. Gap 42 is of sufficient width to allow slot 8 to simultaneously accommodate both simulacrum 28 and conventional magnetic stripe card 44 having tracks 43 and 45. By exhibiting resilient mechanical properties, substrate 34 serves to protect inductor 40 and traces 36 from abrasion by the repeated sliding of a magnetic card within the slot along the simulacrum and adjacent to magnetic reader head 10. By exhibiting a low coefficient of friction, the simulacrum facilitates movement of the card through the slot with minimal degradation to both the card and the simulacrum.

While the above description and illustrated figures relate to an embodiment of a ViVOadapter structure that is configured to interact with a card having two magnetic stripes, the present invention is not limited to this particular example. A ViVOadapter in accordance with alternative embodiments of the present invention could be modified to emulate signals from a magnetic stripe card having three or an even greater number of magnetic tracks, utilizing substantially the same technology described herein.

The ViVOadapter 14 has a mechanical design to conform to the POS card swipe reader device. During installation, simulacrum 28 may be inserted into slot 8 such that the inductor core element 40 is aligned with the magnetic head. The installation or alignment guide 49 having the same thickness of a magnetic stripe card and temporarily attached to the simulacrum accompanies the simulacrum into the slot 8 within gap 42, pushing simulacrum 28 against the side of the slot, and aligning the inductor 98 to a position directly opposite that of the magnetic head. With guide 49 still present in slot 8, simulacrum 28 may then be secured within slot 8 by folding down upper simulacrum tab portions 28a, including the top of inductor structure 40, to conform with and adhere to the top surface of the reader 2. Cap 33 may be placed over the folded top portion of inductor structure 98 to physically protect the inductor core element ends and the coils wrapped around the inductor core element ends from damage or disturbance. In addition, end simulacrum portion 28b may be folded to conform with and adhere to the rear of the reader 2. Once the simulacrum 28 is secured in the slot, installation guide 49 may be removed.

As just described, an adaptor in accordance with an embodiment of the present invention is designed to adapt to the existing magnetic stripe card reader without requiring modification or alteration of the reader or its normal capabilities. Thus embodiments of the simulacrum in accordance with the present invention may, but are not required to be, substantially permanently fixed within the slot of the magnetic stripe card reader though adhesion of top and end portions of the simulacrum to the housing of the reader, or through other means. Installation of the simulacrum within the existing magnetic stripe card reader is reversible, however, and under non-routine conditions the simulacrum may be removed from the reader for inspection or for replacement due to updating or wear or damage.

A molded plate 25 specially designed to the match the front of a particular POS device may secure module 26 in place. Examples of known POS magnetic stripe card readers to which a plate may be created to facilitate contact include, but are not limited to, the TRANZ and OMNI systems of VeriFone, Inc. of Santa Clara, Calif., the T7, T8, and ICE systems of Hypercom Corporation of Phoenix, Ariz., the NURIT 2085 and 2080 systems of Lipman Electronic Engineering Ltd. of Tel Aviv, Israel, the SUREONE and SUREPOS systems of International Business Machines Corp. of Armonk, N.Y., the ELITE system of INGENICO of Cedex, France, the MAGIC system of SchlumbergerSema of New York, N.Y., the 8000 series of INTELLECT of Brussels, Belgium, and the PAYWARE system of the Trintech Group Plc. of Dublin, Ireland.

FIG. 2 shows an enlarged view of simulacrum 28 of FIG. 1, as viewed from the side opposite the magnetic head of the card reader. Simulacrum 28 includes electrically conducting traces 36a–d in communication with electrical coils 38a–d which wrap around various inductor elements 40a–d, respectively, forming a complete inductor structure 98. Ends of traces 36a–d terminate in respective contacts 46a–d.

FIG. 3 shows an exploded view of simulacrum 28. FIG. 3 shows the relative position of traces 36, inductor core elements 40, and coils 38 relative to magnetic head 10 of card reader 2. FIG. 3 also shows that simulacrum 28 may comprise multiple layers of material. For example, as previously described, the narrow width of the simulacrum allows it to be present in the slot of the magnetic stripe card reader at the same time as a magnetic stripe card. However, repeated contact between the simulacrum and such a card can damage or degrade the simulacrum. Accordingly, in the particular embodiment show in FIG. 3, substrate 34 facing gap 42 could exhibit physical resilience or a low frictional coefficient properties to facilitate repeated sliding of the magnetic card stripe card. Alternatively, the substrate could bear a film exhibiting one or more of these properties.

Figure 4:
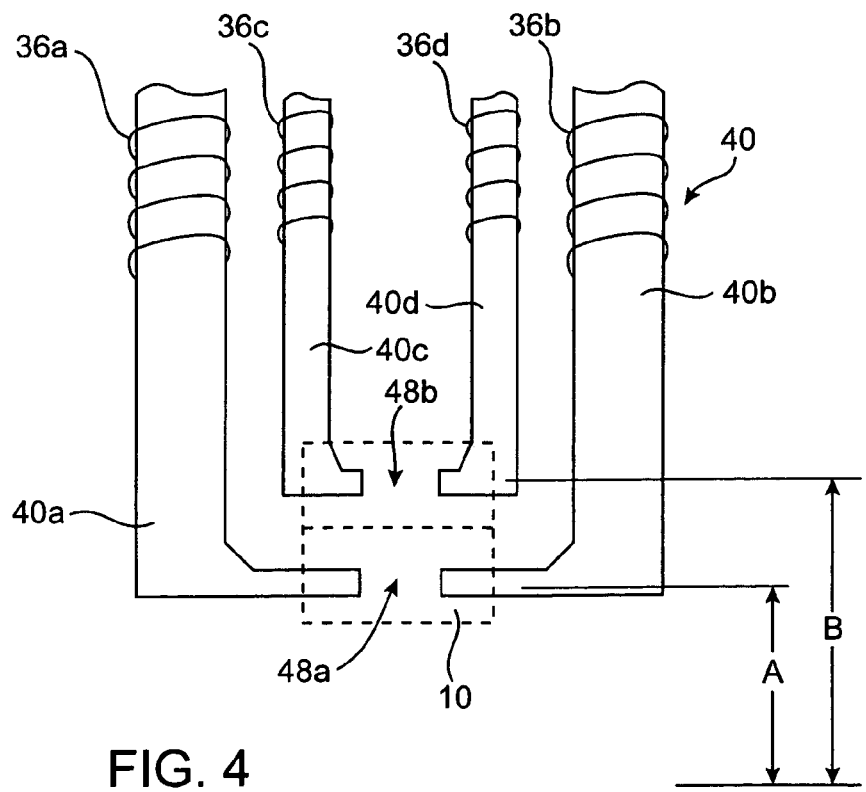
FIG. 4 shows a simplified enlarged view of the inductor core elements of the embodiment shown in FIGS. 2–3.

FIG. 4 shows an enlarged view of the differential inductor structure 98 of the simulacrum 28, as viewed from the side opposite the magnetic head 10 of card reader 2, which is shown in broken lines. Differential inductor structure 98 comprises first and second separate and unattached opposing core elements 40a and 40b defining first magneto-inductive gap 48a positioned at a first height "A" corresponding to the expected height of a track of a magnetic stripe of a card inserted within slot 8. Third and fourth separate and unattached opposing core elements 40c and 40d of differential inductor 40 define second magnetoinductive gap 48b positioned at a second height "B" corresponding to the expected height of a second track of a magnetic stripe card inserted within slot 8. Similar arrangement of coil and inductor core elements may be included to emulate additional magnetic card stripe tracks that may be sensed by varieties of magnetic card readers.

Upon communication of a voltage to coils 38a–d encircling portions of inductor core elements 40a–d respectively, magnetic fields exhibiting horizontal magnetic flux domain orientation are generated across gaps 48a and 48b. Such horizontal orientations of the magnetic flux domain of these fields is useful to emulate the orientation of the magnetic domain resulting from movement of the encoded tracks of a magnetic stripe card past the reader head used in the conventional card reader devices.

During operation of the ViVOadapter 14, the magnetic fields created across the magneto-inductive gaps 48a and 48b defined by the simulacrum inductor elements may be controlled by the ViVOadapter microcontroller via connecting traces 36 and contact pads 46. The inductor will receive data in a serial process from the wireless receivers via the wireless interface processor, and in response provide translational magnetic fields at the differential inductor core gaps for emulation of one or more tracks associated with a magnetic card.

An inductor structure in accordance with embodiments of the present invention would be expected to generate a magnetic field having sufficient intensity to couple to the magnetic reader head across the thickness of the substrate and any gap defined between the simulacrum and the reader head. However, the magnetic field produced by the inductor structure should not be so strong as to saturate the head, cause inter-track noise, or cause unwanted coupling with other components of the POS equipment. Thus in particular embodiments, the coil structures would be expected to receive a current of between about 100 µA and 100 mA and operating voltages between about 1 V and 50 V, and in response generate a magnetic field having an intensity equivalent to emulate magnetic card domains of between about 1000 and 10,000 oersteds.

Figure 4A:
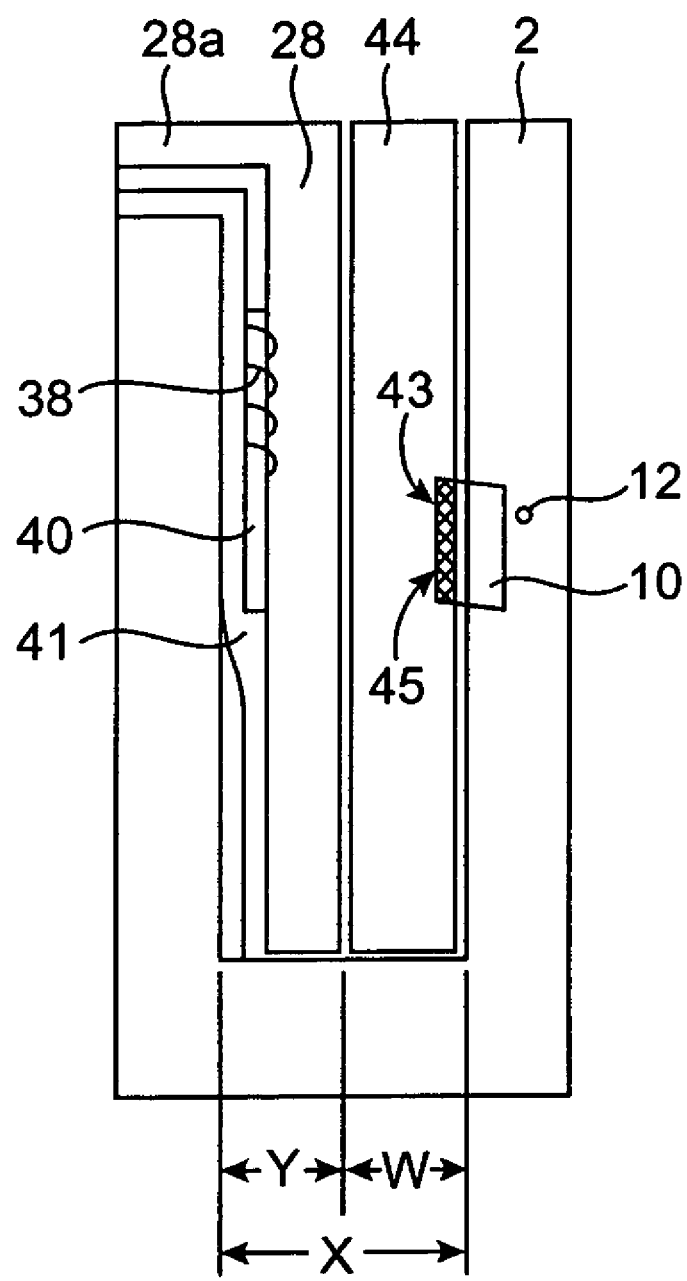
FIG. 4A shows a simplified end view of a slot of a magnetic stripe card reader containing the simulacrum and a magnetic stripe card.

While a variety of inductor and simulacrum structures may be employed by various embodiments in accordance with the present invention, these embodiments may share several common features. For example, ISO/IEC specification 7811 governs the architecture and operation of magnetic stripe cards and reader devices, including such parameters as the width of the card and positioning of the magnetic stripe. FIG. 4A shows an end view of such a slot of a magnetic stripe reader. Slot 8 has a total width "X" of between about 0.060" and 0.090". Magnetic reader head 10 may be biased by leaf spring 12 to project a distance of between about 0.000" and 0.090" into slot 8, but head 10 may be biased back into the reader housing by the sliding card to lie flush with the slot wall. Simulacrum 28 may occupy a thickness "Y" of up to about 0.040" of slot 8, leaving gap 42 of distance "W" of approximately 0.050" to accommodate magnetic stripe reader card 44 having a thickness of approximately 0.030–0.040". In this manner, an adaptor in accordance with embodiments of the present invention would conform to the dictates of the ISO 7811 magnetic card standard, and the associated capabilities of typical magnetic card reader systems.

The differential inductor structure illustrated in the embodiment of FIG. 4 offers a number of advantages. One benefit is that core elements 40*a–d* are not physically connected: they are separate and distinct pieces. This offers the advantage of imposing a greater magnetic flux density in the magneto-inductive gaps 48*a* and 48*b* because of the ratio of coil windings area and the inductor core elements area, smaller space requirements due to the smaller coils on each inductor core element, and the ability to remotely locate the core with coil winding simply through the use of extended core elements that can be shaped and constructed into longer pieces. The coil windings on the inductor core elements are separate and distinct and may be electrically charged individually via each distinct trace. Alternatively, the coil windings may be electrically charged concurrently through serial connection of the coils in such manner as to develop a positive field on one core element gap, and a negative field on the other core element gap, thereby causing a differential induced field at the gap of the inductor core elements.

The embodiment of the ViVOadapter illustrated and described in connection with FIG. 4 shows a simulacrum utilizing a differential inductor structure designed to emulate a card having two magnetic stripe tracks. However, the present invention is not limited to this particular embodiment, and other structures for converting electrical signals into magnetic signals in a form recognizable to a magnetic reading head would also fall within the scope of the present invention. Also, more coils, inductor core elements, and electrical traces can be added in order to permit interfacing with magnetic card readers capable of reading cards having more than two tracks. Additionally, the use of high-plasticity ferroelectromagnetic elements is envisioned. These elements may be charged to create an electromagnetic field.

A benefit of the tape-based differential inductor simulacrum is its maximum thickness of 0.040" and a typical thickness of 0.025" allows the tape to remain in the magnetic card POS swipe/insert reader devices slot concurrent with accessibility of a standard IEC-ISO 7811 format card. This will not render invalid the POS reader device qualifications and specifications because no electrical connection or mechanical components will be altered in function. Additionally, the ease and rapidity of installation with the alignment guide will be advantageous for the technician, with lower associated skills required and risks of alignment or other installation errors. Another benefit of the design of the simulacrum inductor structure is that it can also be utilized to capture magnetic card data.

Figure 17:
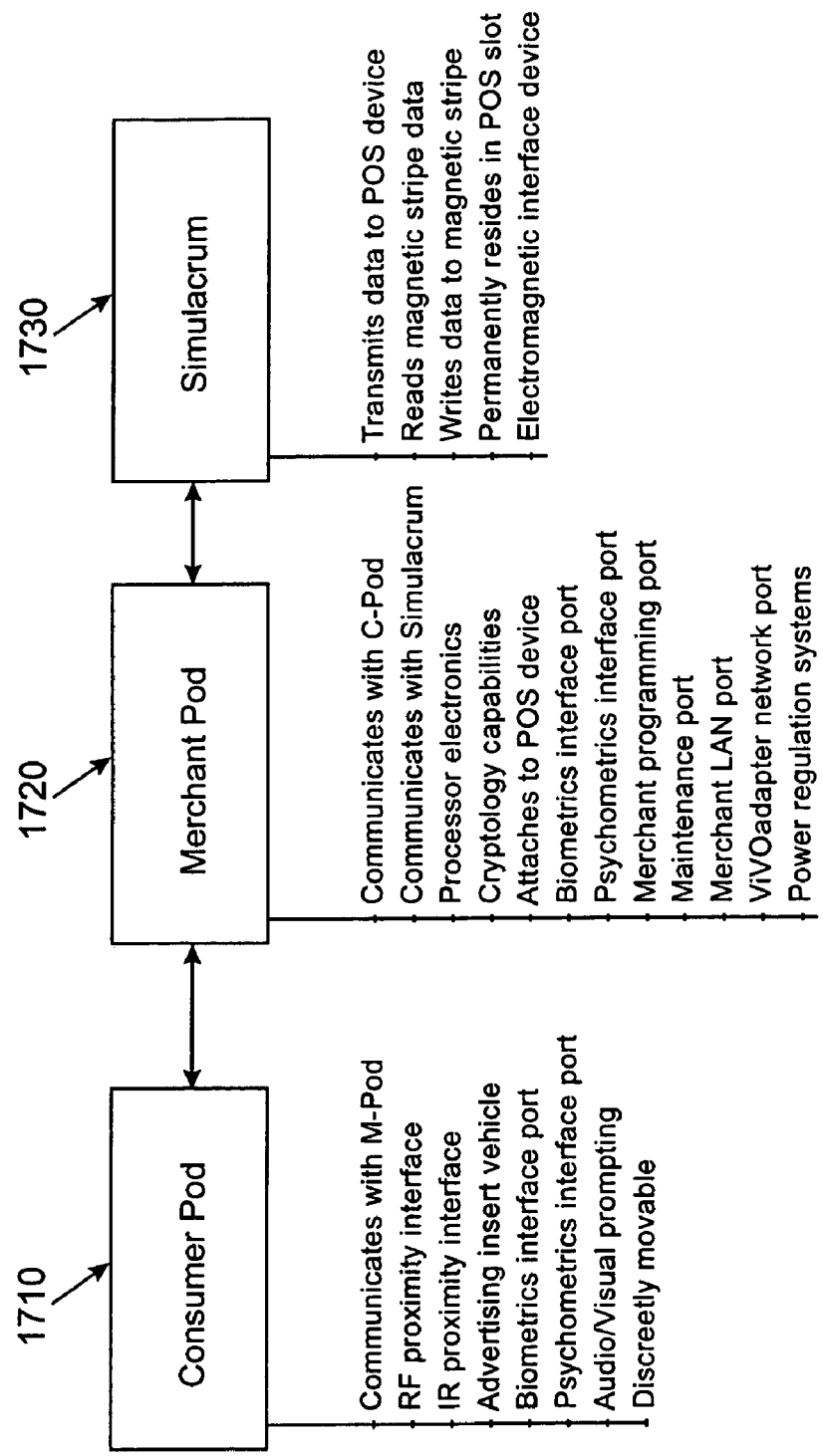
FIG. 17 is a simplified block diagram summarizing functionality of major components of an embodiment of an adaptor in accordance with the present invention.

FIG. 17 is a simplified block diagram summarizing functionality of major components of an embodiment of an adaptor in accordance with the present invention. FIG. 17 depicts the ViVOadapter as an integration of three primary components: the Consumer Pod 1710, the Merchant Pod 1720, and the simulacrum 1730. Consumer Pod 1710 houses electronic components for RF and IR communications with the user and acts to transmit the related data to the Merchant Pod 1720 for transmission to the Simulacrum 1730. The Consumer Pod may be discreetly moveable for convenience of user interaction and provides a surface for advertising text and graphics visible to the user. The Consumer pod may also provide audio-visual indicia for prompting of the user during interaction. The Consumer Pod may also provide electronic interface components for such user-related peripherals as biometric and psychometric devices as finger-print and pin-pads. Additional input devices may include bar-code scanners and iridology devices as described herein.

The Merchant Pod 1720 may house the main electronic components associated with CPU and programming functions, and with interface components for the Consumer Pod, Simulacrum, and power regulation. The Merchant Pod may attach to the POS reader and utilize a cryptographical processor to provide secure data to the main microprocessor which communicates with the Simulacrum 1730 and C-Pod 1710. The Merchant Pod has a communications port which may be used for merchant preference programming and communications with the merchant's network, and ViVOadapter networks as described herein. The communications port may be used for biometric and psychometric devices such as finger-print analyzers and pin-pad for alpha-numeric user codes. Additional input devices may include bar-code scanners and iridology devices as described herein. Maintenance upgrades of firmware and software may be effected via the communications port either directly with another computer device or cellular/wireless ISP transceiver, or remotely with the wired telecommunications system The simulacrum 1730 may be substantially permanently installed within the POS magnetic card acceptance system card swipe slot and acts to produce a highly localized electromagnetic field, via magneto-inductive gap technology, for coupling with the POS magnetic reader head. The simulacrum is capable of transmitting data to multiple tracks on the POS reader head. In an alternate embodiment, the simulacrum is capable of reading magnetic card data and transmitting this data to the Merchant Pod. In still another alternate embodiment, the simulacrum is capable of writing data to the magnetic card stripe.

Figure 5:
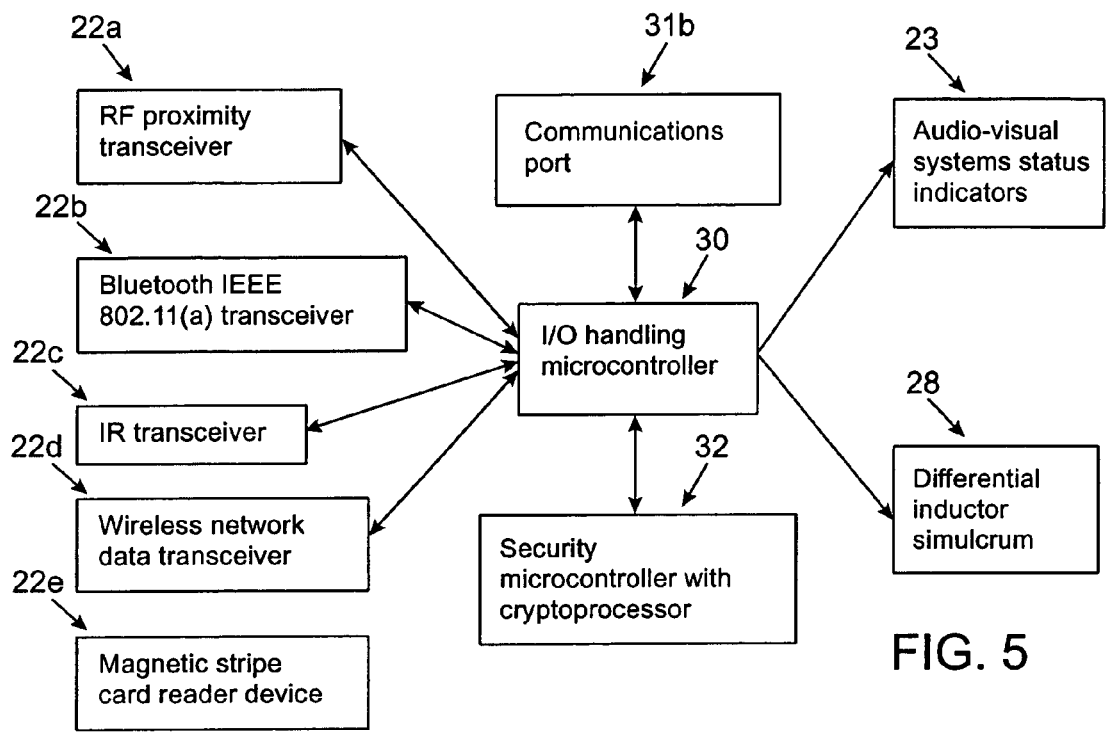
FIG. 5 shows a simplified block diagram illustrating functionality of an embodiment of an adaptor in accordance with the present invention.

FIG. 5 is a simplified descriptive block diagram illustrating elements of the ViVOadapter and related system components. This systems diagram depicts an intelligent device with microprocessor 30, including firmware, software, ROM, RAM, and firmware/software control logic, a "smart chip" micro-controller with integrated cryptographic co-processor 32 conforming to the EMV (Europay/Master Card/Visa) security smart-card standards specifications and capable of generation of symmetrical and asymmetrical encryption keys and performing typical cryptographic analysis standard to "smart cards" and internet-based financial transaction browsers. Input-output devices include the RF ISO 14443 Type A/B and ISO 15693 proximity transceiver 22*a*, Bluetooth IEEE 802.11(b) or other RF protocol transceiver 22*b*, IrDA compatible infrared transceiver 22*c*, audio and visual cue/system status indicators 23, and the differential inductor simulacrum 28 that will emulate a dynamic magnetic stripe typical to credit/debit/ATM/pre-pay/loyalty/member/ID magnetic stripe cards.

The ViVOadapter microcontroller is merchant programmable through communication port 31*b* and has public key interface (PKI) and digital certificate software features for mutual device authentication, data integrity verification, and secure encryption communications with the user's PTD. Communication port 31b may also receive an electrical cable which enables direct communication with other devices, such as a laptop computer utilized to communicate with the adaptor to implement programming upgrades and other maintenance, communication with the merchant's systems and network to allow concurrent financial transaction and order processing among other capabilities, peripheral communications, and other devices described herein.

Controller 30 will also enable the merchant/user to select the preferred communications mediums that include RF 14443 type A and/or type B and RF 15693, IR, Bluetooth IEEE 802.11(b) or other RF protocol such as IEEE 802.11(a) or 802.11(g), and cellular/wireless ISP or wired providers, either discreetly or collectively. The controller will also accept unique merchant/user codes and relevant data associated with the merchant/user for identification and non-repudiation schemes. Wireless data transceiver 22d may be integrated for PTD-wireless network/ISP and PTD-ViVO-adapter RF and Short Messaging Service (SMS) protocol communications for transactions beyond normal short range RF and infrared distances, or for mobile transactions. As described below in connection with FIG. 6, certain alternative embodiments may include integrated redundant magnetic swipe card reader 22e.

Only certain embodiments in accordance with the present invention are shown and described in the instant disclosure. One should understand that the present invention is capable of use in various other combinations and environments and is capable of changes and modifications within the scope of the inventive concept expressed herein.

For example, while the embodiment illustrated and described in connection with FIGS. 1–4 shows a simulacrum which is of sufficiently narrow dimensions to allow for the presence of a magnetic stripe card in the slot, this is not required by the present invention. In accordance with an alternative embodiment of the present invention, a ViVO-adapter could include a separate, substitute magnetic card slot, magnetic reader head, and processor for receiving signals from the magnetic reader head by an IEC ISO 7811 conformal magnetic stripe card, and still remain within the scope of the present invention.

Figure 6:
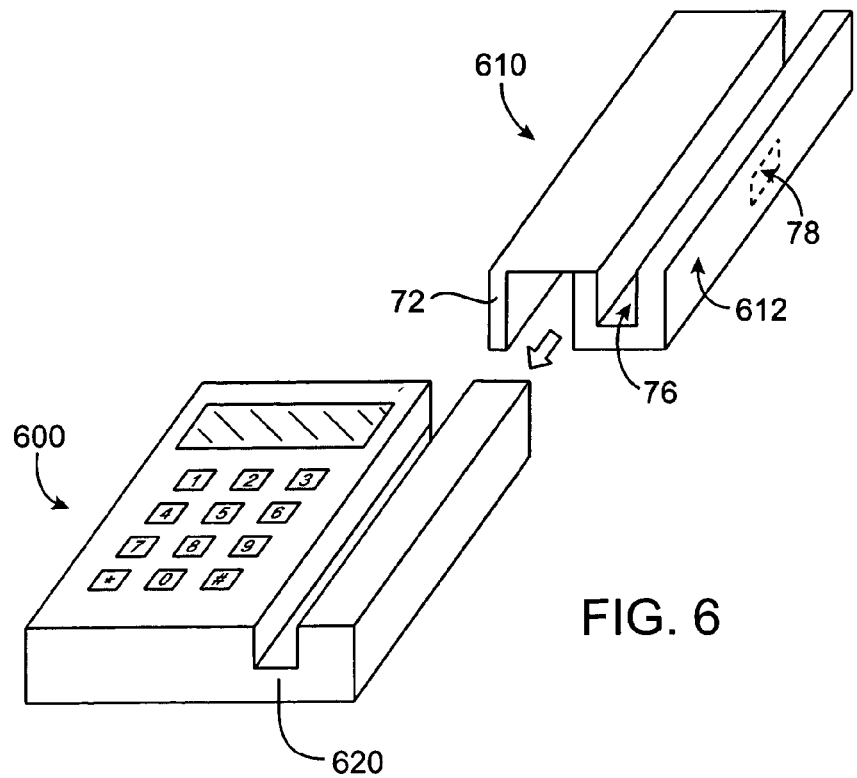
FIG. 6 shows a simplified perspective view of an alternative embodiment of an adaptor structure in accordance with the present invention.

This approach is illustrated in FIG. 6, which shows a perspective view of an alternative embodiment of an adaptor for a magnetic stripe card reader in accordance with the present invention. Magnetic stripe reader adaptor 610 comprises simulacrum 72 that is similar in shape and function to that described above in connection with FIGS. 1–4, except that its width is not required to be sufficiently narrow to permit a magnetic stripe card to be inserted into the slot at the same time. Instead, alternative adaptor structure 610 features a separate magnetic stripe reader component 612 including slot 76 and magnetic head 78 in electromagnetic communication with slot 620 of conventional magnetic stripe card reader 600. Swiping of a magnetic stripe card in slot 76 across magneto-inductive head 78 creates a series of pulses. These signals are received by a processor and converted into a format recognizable by the second magnetic head of the existing POS device by the simulacrum as described in the primary embodiment. The adaptor 610 shown in FIG. 6 may include a separate C-Pod portion (not shown) that is in wired or wireless communication with the adaptor portion housing the simulacrum and the separate magnetic stripe reader component.

The alternative embodiment shown in FIG. 6 will be capable of capturing magnetic card data during the swipe process, storing it in temporary memory, and transmitting this data to the PTD or to the ViVOserver, or to a third party data repository via wireless or wired communication such as a network modem for DSL. The data can be encrypted and a decryption key transmitted to the PTD via the wireless carrier/ISP. The PTD user will retrieve the key upon satisfaction of a proper authentication process, for example one performed in conjunction with the ViVOwallet or another eWallet-type application.

While the embodiment of the present invention described in FIGS. 1–4 is shown adapting to a POS magnetic card reader having an exposed slot, the present invention is not limited to this particular type of configuration. FIGS. 7A and 7B show simplified perspective views of the use of an adaptor in accordance with an embodiment of the present invention for use with a magnetic card POS card insert device 640 typically installed in a vending machine or ATM. ViVOadapter 645 including differential inductor simulacrum 665 is attached with cable 667 routed to the remotely located ViVOadapter case 645. The differential inductor simulacrum tape 665 is attached to the card reader device in such a manner to allow direct contact of the differential inductor simulacrum with the card reader magnetic head sensing component 652 while ensuring continued magnetic card insert functionality. Simulacrum 665 of ViVOadapter 645 is positioned proximate to an existing card swipe slot 645 having a magnetic read head 652, until both units are in vertical and horizontal alignment. The magnetic card 655 is inserted into the slot and acts to lift the tape with differential inductor simulacrum 665 until the card is physically between the magnetic read head 652 and the differential inductor simulacrum 665 as shown in FIG. 7B. The visual indicators 670 and infrared transceiver components 675 can be integrated with the ViVOadapter case design 645, or may be remotely located and communicate with the simulacrum 665 through cables or wireless means. A bi-directional data port 680 is provided for interface with existing or future POS card systems and the ViVOadapter power cable 690 is attached to the POS device or system, or attached to a dedicated power supply.

A benefit of this design configuration is the ease and speed of deployment in the merchant POS card reader devices. Additionally, the POS card reader device will only have magneto-inductive coupling with the ViVOadapter and this will not compromise the qualification or security of the POS card reader device.

Another example of possible variation from the particular embodiment shown in FIGS. 1–4A is to vary the structure of the inductor core elements. For example, an alternate embodiment of an inductor structure for a simulacrum in accordance with the present invention is shown in FIG. 8. Inductor 750 comprises two core elements 755 and 760 bearing complimentary saw tooth shapes and encompassed by coils 705. The saw-tooth edge provides a horizontal magnetic domain field flux component via trigonometric function of the angle of the gap orientation. This will enable the simulacrum to be placed in the approximate, but not necessarily exact, position of the POS card system magnetic reader head component to effect a digital signal on the output leads. A benefit of the design of the differential inductor structure of the simulacrum shown in FIG. 8 is that it provides horizontally-oriented magnetic flux-field domains in a linear process over any length of distance, due to the trigonometric function of horizontal and vertical magnetic fields. This characteristic enhances alignment tolerance for the merchant or user installing the ViVOadapter into the slot of the magnetic stripe reader device, and accommodation of variations in dimensions and mechanical design for the various POS card swipe/insert systems to which the ViVOadapter is intended to fit.

As described so far, embodiments of adaptors in accordance with the present invention have functioned primarily to receive information from wireless devices such as RF proximity chip cards or personal trusted devices (PTDs) such as PDAs or cell phones, and to translate this information to a format recognizable by a conventional magnetic stripe card reader to effect a purchase or other type of electronic transaction. However, an adaptor structure in accordance with embodiments of the present invention is not limited to performing this particular function.

For example, in one alternative application for a ViVOadapter in accordance with the present invention, a ViVOadapter located at a merchant could be utilized by a user as a remote portal allowing relevant information from a conventional plastic magnetic stripe card to be imported into an electronic wallet device. In one embodiment, information read from the magnetic stripe card by the magnetic head could be communicated back to the ViVOadapter through the communications port, stored, and then transmitted to the PTD though a transceiver described herein, such as an IR or RF transceiver.

In accordance with an alternative embodiment, reading of information from the magnetic stripe card could result in the ViVOadaptor communicating with a remote data repository to obtain authorization for transmission of the magnetic stripe card data to the PTD. Upon receipt of such authorization from the remote data repository, the Adaptor could communicate the credit card data to the PTD directly, or communicate the data indirectly by providing to the PTD a key allowing decryption of a separate message containing the credit card information. This separate message could be transmitted through a wired or wireless network to the PTD directly, or indirectly via the ViVOadpater.

In another alternative embodiment, the inductor components of the simulacrum would be capable of reading data directly from a magnetic stripe card in a similar manner to the magneto-inductive reader heads of conventional POS devices. The data read could be stored in the adaptor and then transmitted in a secure manner to any authenticated PTD with installed eWallet software capable of communication with the ViVOadaptor and authorized by ViVOtech, Inc.

In accordance with another possible alternative application, a ViVOadapter may be used to facilitate the communication of data to a personal trusted device from a source such as another personal trusted device. In one embodiment, the adaptor would receive data at its wireless interface from one authenticated source, store the received data, and then transmit the data to an authenticated PTD. The data transmitted would not be limited to financial information and could include a financial management software application, thereby allowing a PTD not already containing the software to install the software and utilize the information from the first PTD without delay. Moreover, additional security could be imparted to the information transfer by causing the information to be encrypted by the ViVOadapter prior to transmission to the PTD. In such an application, the PTD would receive a decryption key in a separate message before the transferred data could be accessed.

Moreover, the source of the data communicated to the PTD need not be a second PTD, and could be a merchant network and supporting system interfaced with the communications port of a ViVOadapter. Communication with such a merchant network may enable transfer of information such as merchant coupons and loyalty program data to the PTD/RF proximity chip card at the point of sale, or anywhere a ViVOadapter is placed within a merchant's place of business. Multiple ViVOadapters with wired or wireless cellular ISP transceivers may be used as transponders relaying information to the user and to the merchant. Such information may be used for profiling of user purchasing habits and processes, and merchant promotion of coupons, gift certificates, and other instruments to the user's PTD. In still other embodiments, ViVOadapter can be used to communicate a financial management application directly at the POS, thereby enabling a PTD lacking the financial management application to ultimately communicate with a ViVOadapter.

In still another embodiment, an adaptor structure in accordance with the present invention can be utilized to disable stolen or unauthorized magnetic stripe cards without the knowledge of the person attempting to use the card. Upon swiping of a stolen or unauthorized card, the magnetic stripe card reader would receive a signal denying the transaction and authorizing destruction of the card. This message could in turn be communicated to the ViVOadapter through the communication port. Upon receipt of the message authorizing destruction of the card, the ViVOadapter could be programmed to request that the prospective purchaser swipe his or her card again. Without the awareness of the prospective purchaser, during this second swipe of the card the ViVOadapter could cause the inductor to generate a electromagnetic field of sufficient intensity to alter the polarization of the magnetic stripe domains on the card. This technique would be sufficiently effective to disable the card for any future use, regardless of how much data, beyond a single bit, is written onto the magnetic stripe of the card, because of strict requirements of IATA and ABA industry standards regarding the integrity of card track data. Once the card is disabled in the manner described above, the transaction would be again refused, but without promoting any confrontation between the merchant and the prospective card user. In an alternative embodiment, disabling of the card may be based upon a signal received from a separate wireless transceiver in communication with a third party fraudulent or unauthorized card database, for example that found at http://www.cardcops.com.

An embodiment of a method for disabling a magnetic stripe card in accordance with the present invention comprises providing a magnetic stripe card reader having a slot and a magnetic head in magnetic communication with the slot. An adaptor is provided having a transceiver configured to transmit a signal to a personal trusted device, or via cellular wireless ISP, or internet, to card issuers or acquirers or other parties authorized by the card issuer to authorize card destruction, a memory in communication with the transceiver, and a simulacrum including an inductor. The simulacrum is disposed substantially permanently within the slot such that the inductor is aligned with the magnetic reader head, the simulacrum sufficiently narrow to allow a magnetic stripe card to access the slot and the magnetic head while the simulacrum is present within the slot. A magnetic stripe card is swiped through the slot such that information on the magnetic stripe card is read by the magnetic head. The information is communicated to a remote data repository. A signal indicating invalidity of the magnetic stripe card is received from the remote data repository and communicated to the adaptor. In response to the signal, the inductor generates an electromagnetic field of sufficient strength to alter at least one bit of data stored on a magnetic stripe of the magnetic stripe card.

II. Adaptor Hardware and Software

Figure 9:
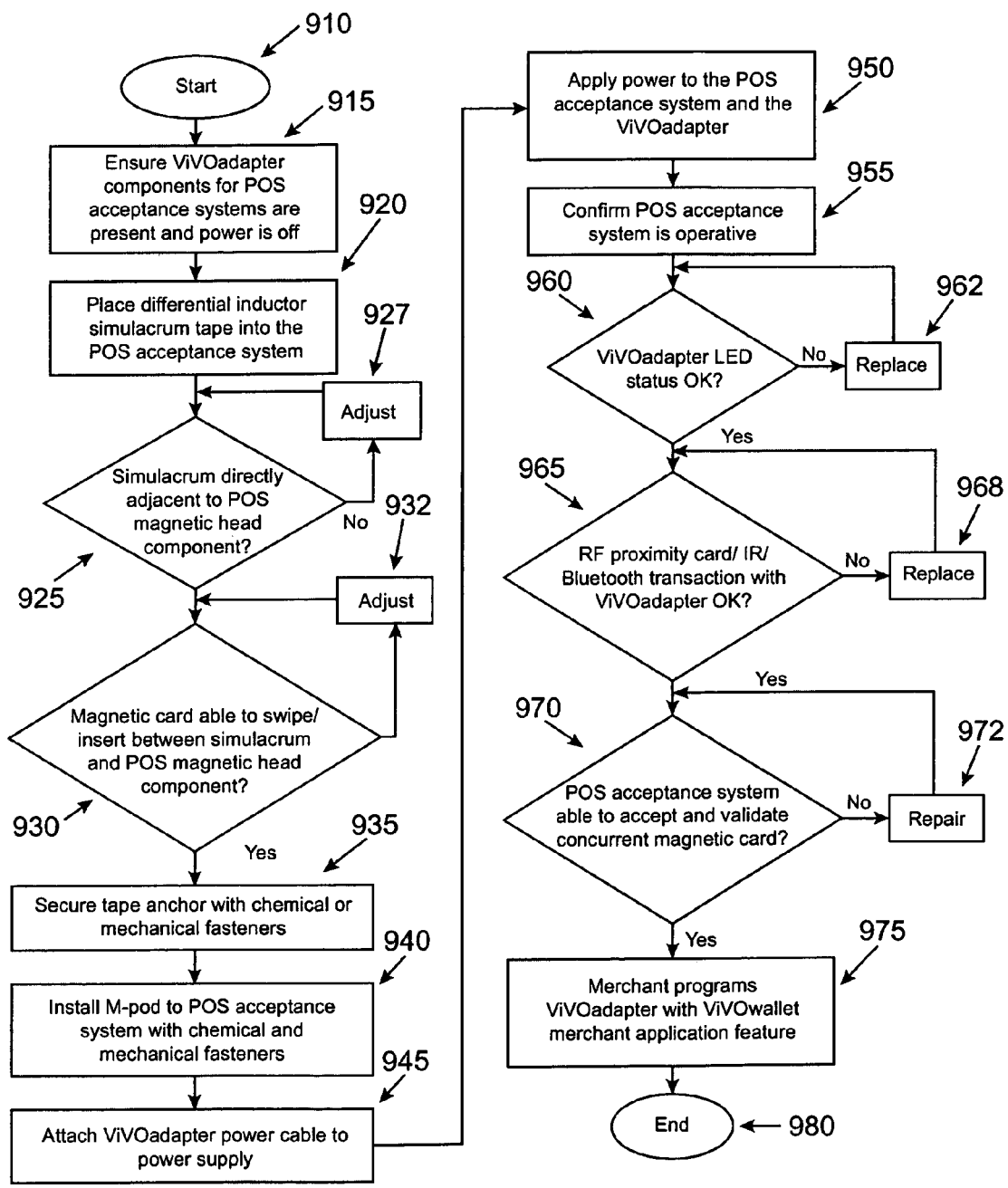
FIG. 9 is a simplified logical diagram of the installation of an adaptor to a magnetic stripe card acceptance system.

FIG. 9 is logical diagram of the installation of a typical ViVOadapter device in the POS systems. The technician will ensure all ViVOadapter components and tools are available 910, 915 and will place the differential inductor simulacrum tape into the POS system 920, so that the simulacrum is directly in contact with the POS systems magnetic head component 925, with any necessary adjustment as defined by the alignment guide attached to the simulacrum 927. The technician will confirm that normal magnetic stripe cards are able to be swiped or inserted into the magnetic head component slot 930 with any necessary adjustment of the alignment guide 932, and will then secure the differential inductor simulacrum tape 935 anchor with chemical/glue or mechanical fasteners included with the installation kit. The technician will install the ViVOadapter M-pod to the POS system 940 and secure with chemical/glue or mechanical fasteners included with the installation kit and then attach the power cable 945 to the POS system, or to a dedicated power supply. The technician will then apply power 950 to the POS system and ViVOadapter with confirmation that the POS reader or machine is operative 955. The technician will then confirm the ViVOadapter status indicators are normal 960 and replace 962 the ViVOadapter if this test is failed. The technician will then confirm an RF proximity chip card/IR/Bluetooth IEEE 802.11(b)/SMS/PTD-to-ViVOadapter and wireless network/ISP transaction as specified in the merchant/user programming, is effected 965. The ViVOadapter will be replaced if this test is failed 968. The technician will then confirm the POS system is fully functional and compliant for concurrent reading of magnetic cards 970 and will replace the ViVOadapter if functionality and compliancy are not met 972. Lastly, the merchant will use the ViVOwallet application merchant feature to effect programming 975 of merchant related data for completion of the installation process 980. The ViVOadapter will expect to receive a ViVOtech, Inc. specific authorized code such as "Hello ViVOwallet", to ensure compliance of third party vendors.

Figure 10:
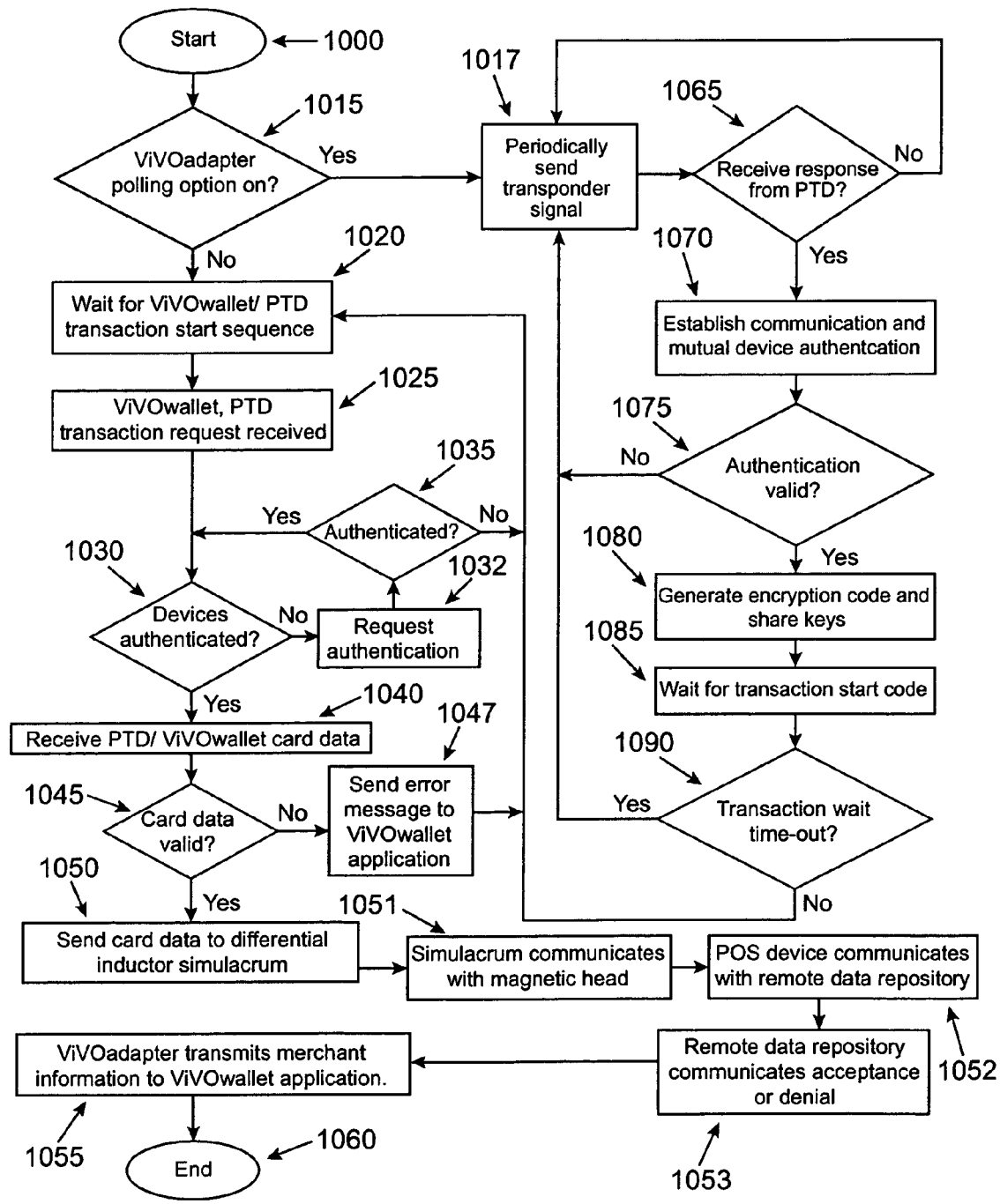
FIG. 10 is a simplified logical diagram of the interface process between an adaptor and a ViVOwallet application.

FIG. 10 is a logical diagram of the interface processes between the ViVOadapter and the PTD electronic wallet application, ViVOwallet pay-and-go™ feature application discussed below, and the RF embedded ViVOwallet application transparent transaction process. The ViVOadapter will be operational 1000 and with the polling feature activated 1015. The ViVOadapter will transmit a transponder signal according to the merchant/user programming preferences that include RF ISO 14443 Type A or Type B and RF 15693, IR type IrDa version 1.2 or higher and ViVOtech Inc. proprietary and Consumer IR, IEEE 802.11(a)(b) or (g), and cellular/wireless ISP and wired protocols and wait for a response 1020. The ViVOadapter will perform mutual device authentication and challenge protocols, exchange security cryptography routines and keys, exchange data typical to credit/debit/ATM/pre-pay/loyalty/member/ID cards magnetic domain track data upon presentation by an RF proximity chip card or via other communication mediums described herein. Additionally, a unique RF proximity chip card or ViVOwallet identification information issued by the manufacturer, card issuer, acquirer, authorizer, and/or ViVOtech Inc. company authorized parties will be transmitted and authenticated.

The ViVOadapter will transmit a transponder signal via RF proximity 14443 type A or Type B and RF 15693/Irda and Consumer IR/IEEE 802.11/cellular wireless ISP and wired provider protocols per merchant preferences on a periodic frequency 1017 until it receives a response from a PTD 25, whereupon it will establish communications and mutual device authentication 1030. When mutual authentication is validated 1030, 1032, 1035, the ViVOadapter will generate initial encryption codes and exchange security routines with the PTD, and exchange security certificates and wait for the ViVOwallet card data or the RF proximity chip card transaction initiation 1040. The ViVOadapter will wait for a period of time prior to time-out, or if card data is not valid 1047 with reset to the transponder state ViVOwallet/RF transaction start sequence state 1020. In the event the ViVOwallet application is active, the ViVOadapter will then wait for the ViVOwallet transaction start sequence code 1065. The ViVOwallet application will acknowledge the ViVOadapter transaction request code and confirm the ViVOwallet application with a unique ViVOtech Inc. identifier such as "Hello ViVOwallet" 1065, and the ViVOadapter are mutually authenticated 1070 within a specified period of time and if not, will then request reauthentication protocol procedures 1075. The mutually authenticated devices will initiate security encryption procedures and generate encryption codes and exchange cipher keys 1080. Once mutual authentication protocols are confirmed and the ViVOadapter is awaiting transaction start codes 1085, the ViVOwallet application or RF proximity chip card will transmit user-specific magnetic card data until transaction time-out period 1090. The ViVOadapter will confirm the card data is valid 1045 via cyclic redundancy check (CRC), linear redundancy check (LRC), or similar method of data integrity verification. If the ViVOadapter is unable to confirm card data validity within a specified number of attempts, then an error message 1047 will be transmitted to the ViVOwallet application and the transaction process will be terminated.

If the card data is validated, then the ViVOadapter will transmit the digital data to the differential inductor simulacrum 1050, which will then communicate the information to the magnetic head component of the POS card reader device 1051. The POS device will in turn transmit the card data to a remote data repository storing card validity information 1052, as is known in the art. The remote data repository will in turn communicate back to the POS device a transaction acceptance or denial signal 1053 based upon card validity information stored in the remote data repository, as is also known in the art. Where a transaction is authorized, the ViVOadapter will then transmit merchant-specific code information 1055 to the ViVOwallet application, with transmission confirmation request, and the transaction will be terminated 1060.

Figure 11:
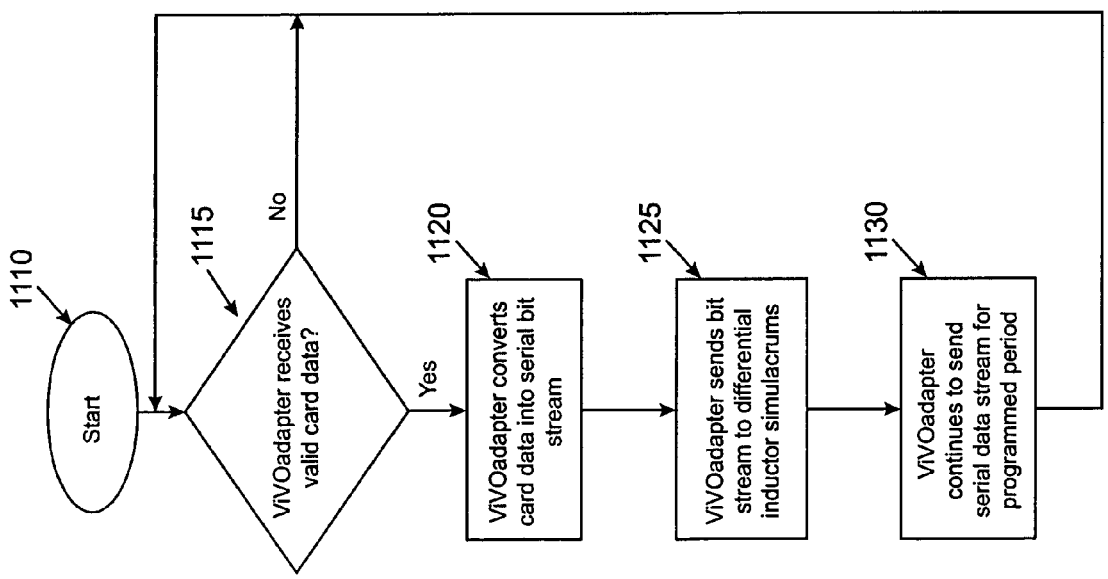
FIG. 11 is a simplified logical diagram of the interface process between an adaptor magneto-inductive structure and a magnetic card swipe/insert acceptance system.

FIG. 11 is a logical diagram of the interface process between the ViVOadapter and POS swipe/insert card acceptance systems via the differential inductor simulacrum 1110. The ViVOadapter should complete the requisite processes described herein and the RF proximity chip card and/or ViVOwallet application card data must be valid 1115. The ViVOadapter will convert the card data into a digital serial data bit stream 1120 for transmission to the differential inductor simulacrum magneto-inductive gaps 1125 in a repetitive and cyclic process until a specified period of time has elapsed 1130.

Figure 12:
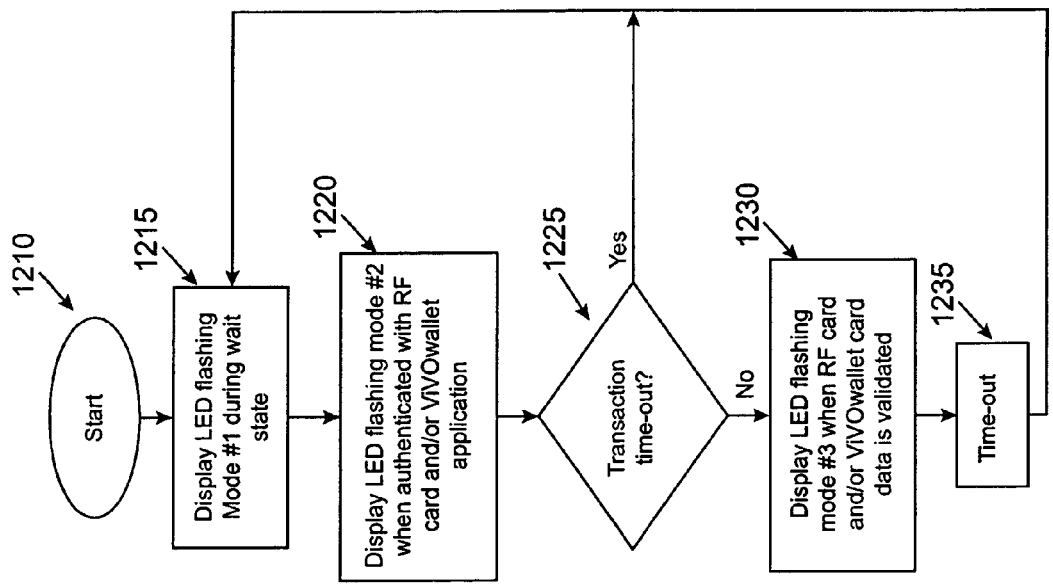
FIG. 12 is a simplified logical diagram of the user visual/audio cue process between an adaptor and a user PTD having the ViVOwallet financial management application.

FIG. 12 is a logical diagram of the user interface visual cue process 1210 to enable the user to determine the length of time to orient their PTD towards the ViVOadapter. The ViVOadapter will display a continuous blinking visual cueing indication/transponder signal with specified periodicity during the waiting state 1215. The ViVOadapter will then increase the periodicity or sequencing of one or more visual indicator(s) when authenticated with a ViVOwallet application or RF proximity chip card 1220. If the ViVOwallet application or RF proximity chip card fails to exchange transaction data within a specified period of time after authentication 1225, then the visual and/or audio cuing indicator(s) will sequence to the wait state 1215. If the ViVOwallet or RF proximity chip card exchanges valid card data during the transaction, then the visual and/or audio cueing indicator may increase in periodicity and indicators or sound to indicate the transaction is completed 1230 and the user is no longer required to maintain RF, IR, or Bluetooth IEEE 802.11(b) communication. The ViVOadapter will time-out within a specified period 1235 and sequence to the transponder wait state 1210.

III. Use of the Adaptor in Conjunction with other Systems

Figure 13:
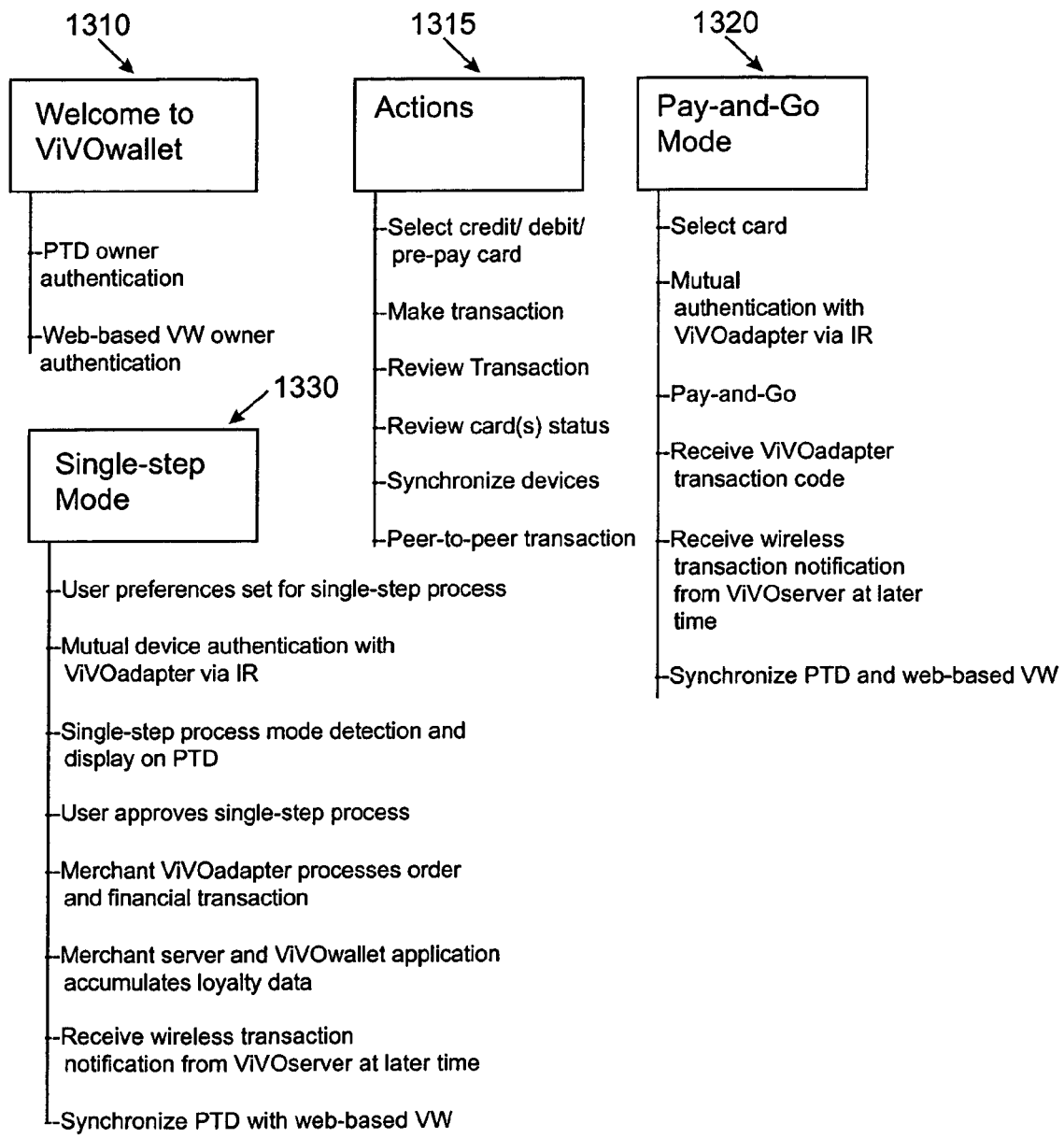
FIG. 13 shows a simplified descriptive diagram of the ViVOwallet™ financial management application.

FIG. 13 shows a simplified descriptive diagram of the ViVOwallet financial management application. The ViVOwallet application aggregates personal financial information and personal credit/debit/ATM/pre-pay/loyalty/member ID card information found on Track #1 and/or Track #2, or additional tracks, of the magnetic stripe of such cards and described by the International Air Transport Association (IATA) and the American Banking Association (ABA) and proprietary groups with encoded magnetic domain bit patterns defined upon the magnetic stripe described by the ISO/IEC 7811 magnetic card conformal specification. These electronic wallet (eWallets) financial management applications represent aspects of one application of embodiments in accordance with the present invention, i.e. the usage of cell phones, PDA, and other varieties of personal trusted devices (PTDs) with the ViVOadapter. The ViVOwallet application also provides software means to communicate with the network based databases, the pay-and-go feature described herein, and the ViVOadapter described herein. The ViVOwallet welcome screen 1310 identifies the application and requests the user to log on with a password for authentication purposes. In operation, the screens may be sequenced by the standard buttons found on the typical PTD and depicts typical selections common to financial management applications which include "select credit/debit/ID/other card", "make transaction", "review transactions", "review card status", and such maintenance functions as "synchronize devices" 1315. The ViVOwallet application may be sequenced to select the pay-and-go feature 1320 for mutual authentication of the cell phone and PDA type PTD and the ViVOadapter, card data transaction processing, and digital receipts within a secure encrypted session. The user may orient the cell phone IR communications component at the ViVOadapter infrared communications component within a typical distance of 1 millimeter to 3 meters. The ViVOadapter will acknowledge the request and establish inter-device communications, exchange mutual authentication processes, and establish a data encryption key for secure data transmission session when wireless and infrared network communication is present. The ViVOwallet application is provided in an embedded version for use with RF proximity chip cards and typically has no user interface for the maintenance and other functions described above. However, these functions are supported by the consumer card issuer/other authorized party PC or network interface for the RF proximity chip card. Examples of systems utilizing embodiments of the ViVOwallet financial management application are described in the following patent applications, incorporated by reference herein for all purposes: U.S. nonprovisional patent applications Ser. Nos. 09/837,115, and 09/875,555, and 10/323,593 filed Dec. 18, 2002.

The ViVOadapter will communicate directly with the RF proximity chip card and embedded ViVOwallet financial aggregation application via RF inductive coupled medium and the two devices will effect mutual authentication in a manner transparent to the user depicted in 1330. The user will present the RF proximity chip card to the ViVOadapter within a distance typically specified in ISO 14443 type A and type B protocols and ISO 15693 protocols and for a period of time required to effect mutual authentication, cryptographic routines for key generation and data security, and transmit typical magnetic domain track data typical to credit/debit/ATM/pre-pay/loyalty/member/ID magnetic stripe cards. An additional data string will be appended. This data string will include part or all of a unique message transaction code, message digest, digital signatures, device (s) serial number, ViVOtech, Inc. and authorized third party specific codes, acquirer codes, issuer codes, manufacturer codes, ViVOserver (discussed in FIG. 14 below) specific codes, and/or other authenticator codes for a unique identification or non-repudiation scheme determined by ViVOtech, Inc. and authorized partners.

A benefit of direct transfer of card information via the wireless carrier/ISP or direct to ViVOadapter is the "card present" association defined by the major card issuers. An internet or verbal-based exchange of card data has higher risk assignment due to card security and will incur higher transaction fees and vendor qualification, in addition to partial responsibility for financial loss by the merchant. A "card present" transaction has lower risk assignment because of standard methods of user identification available to the merchant. The transfer of card data via PTD with ViVOwallet application in a secure process will use the non-repudiation schemes established by the PTD and wireless carrier/ISP services and internet security shell (SSL) protocols.

A benefit of the wireless network-based PTD with the ViVOwallet application is that aggregation of an unlimited number of consumer cards, including credit/debit/ATM/pre-pay loyalty/member/ID, can be maintained on the network-based database server and the PTD for access by the consumer. This secure data aggregation will reduce card "bulk" in the consumer's wallet and will also increase security of the data maintained on existing cards.

Another benefit of the wireless network-based PTD with the ViVOwallet application is the ability to effect financial transactions via IR, Short Messaging Service (SMS) protocol and networks, text paging, fax transmission, and via RF on a device-to-device means or via the wireless carrier/ISP network.

Another benefit of this process is the low cost of wireless communication sessions and resultant fees associated with the transaction costs. The wireless carrier/ISP offers cellular data wireless network transaction typically costs less than 90% of the standard wired carriers and with the security of transaction processes by "strong" encryption standards that will ensure lower "card present" transaction losses, described herein, because of the non-repudiation protocols inherent with cell phone and PTD usage with these wireless carrier/ISP services.

An alternate embodiment of the ViVOadapter is the integration of a cellular transceiver device. This embodiment will enable the user to dial the number associated with the ViVOadapter and effect a purchase via direct PTD to ViVOadapter communications, via the wireless carrier/ISP network, or via SMS protocols.

In still another alternate embodiment, the ViVOadapter may be directly connected to the user's PC for use with the typical communications device and media described herein. This alternative embodiment will enable the user to effect secure transactions via the internet and using cryptographic protocols described herein. An advantage of this configuration is the lower risk of identity fraud associated with on-line transactions, and the ability to securely authenticate the user for non-financial internet transactions and other network-based transactions.

Figure 14:
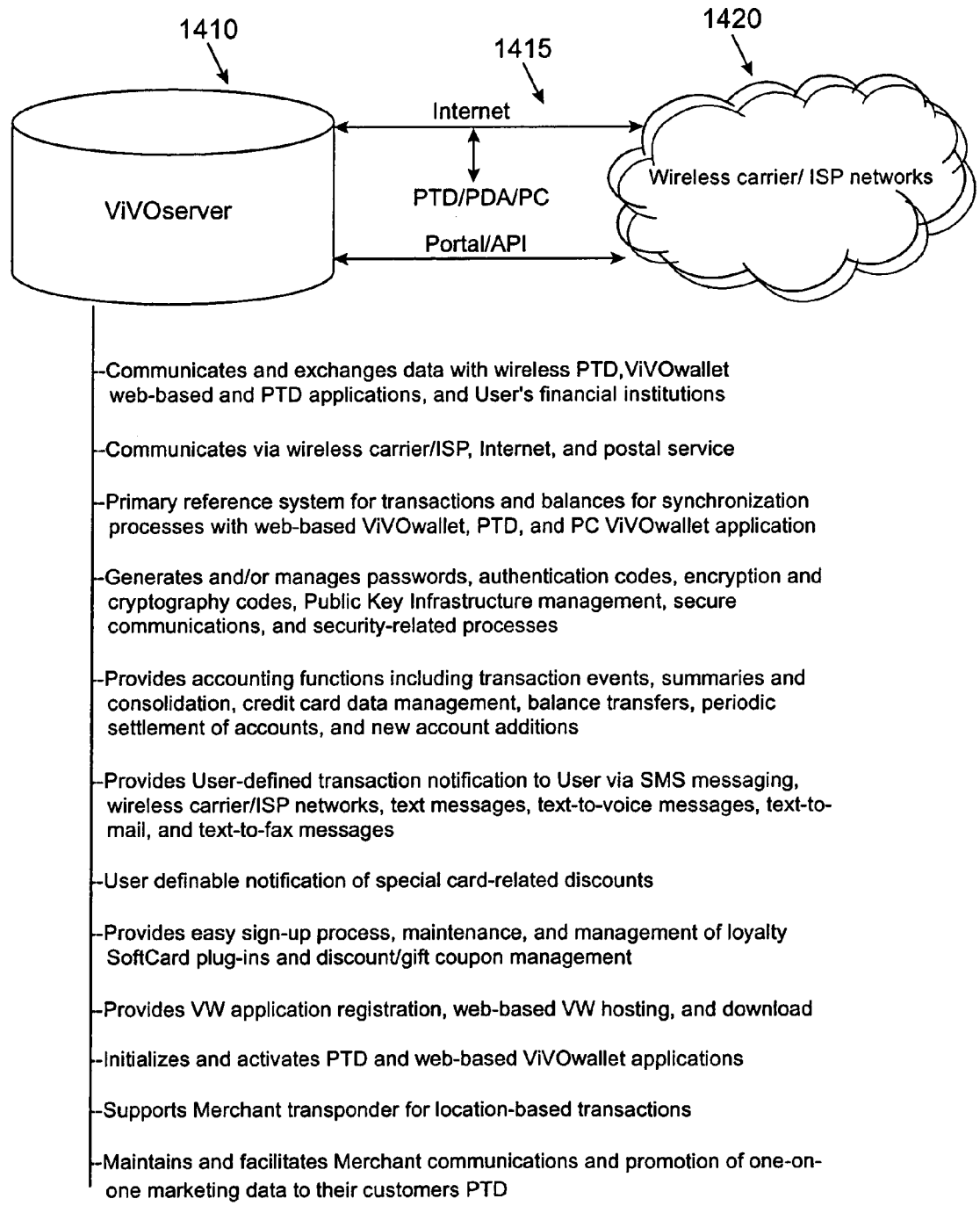
FIG. 14 is a simplified descriptive diagram of the ViVOserver™ data management system.

FIG. 14 is a simplified descriptive diagram of the ViVOserver™ data management system. FIG. 14 shows one particular embodiment which includes features for the network-based server supportive of the invention. The ViVOserver™ database management system 1410 is responsible for communicating and exchanging user and financial institutions data via the internet 1415 and for the ViVOwallet applications in a secure and private process. It may provide card issuer and card transaction clearing house authorizations via cellular/wireless ISP networks for the ViVOadapter configured with the cellular wireless ISP transceiver embodiment described herein. It may also serve as the primary reference system for pay-and-go transactions and balances for synchronization processes with PTD and PC based ViVOwallet applications and PC based ViVOadapter applications.

The ViVOserver may perform a number of important function, such as communicating and exchanging data with wireless PTD, ViVOwallet applications, and User's financial institutions, and communicating via wireless carrier/ISP and Internet. The ViVOserver may provide the primary reference system for transactions and balances for synchronization processes with PTD and the PC-based ViVOwallet application. The ViVOserver may generates and/or manages passwords, authentication codes, encryption and cryptography codes, manage PKI, secure communications, and security-related processes. The ViVOserver may provide accounting functions including transaction events, summaries and consolidation, credit card data management, balance transfers, periodic settlement of accounts, and new account additions. The ViVOserver may provide transaction notification to User via SMS messaging, wireless carrier/ISP networks, text messages, text-to-voice messages, text-to-email, and text-to-fax messages, in addition to similar protocols to be developed in the future. The ViVOserver may allow user definable notification of special card-related discounts, and provides easy sign-up process for loyalty and member cards. The ViVOserver may generate and/or manages passwords, authentication codes, encryption codes and keys, and maintains the PKI cryptology. The ViVOserver enables the user to manage multiple card and banking accounts and communicates with internet-based PC systems via the internet 1415, and communicates with the ViVOwallet application via the PTD wireless carrier/ISP network 1420. The ViVOserver may communicate with the wireless carrier/ISP networks via a portal/applications program interface.

A benefit of the internet-based ViVOserver is that it will aggregate all of the financial and card information provided by the user and will be, upon request by the user, the intermediary for consolidated payments and settlements. Further, the sender will be mobile or stationary and not restricted to a specific location. Further, the ViVOserver will notify the user of transaction events and will be directed by the user to render invalid all cards referenced on the database in the event of loss or theft of the user's cards. Notification can take the form of at least SMS messaging, text messages, text-to-voice, text-to-e-mail, and text-to-fax.

Figure 15:
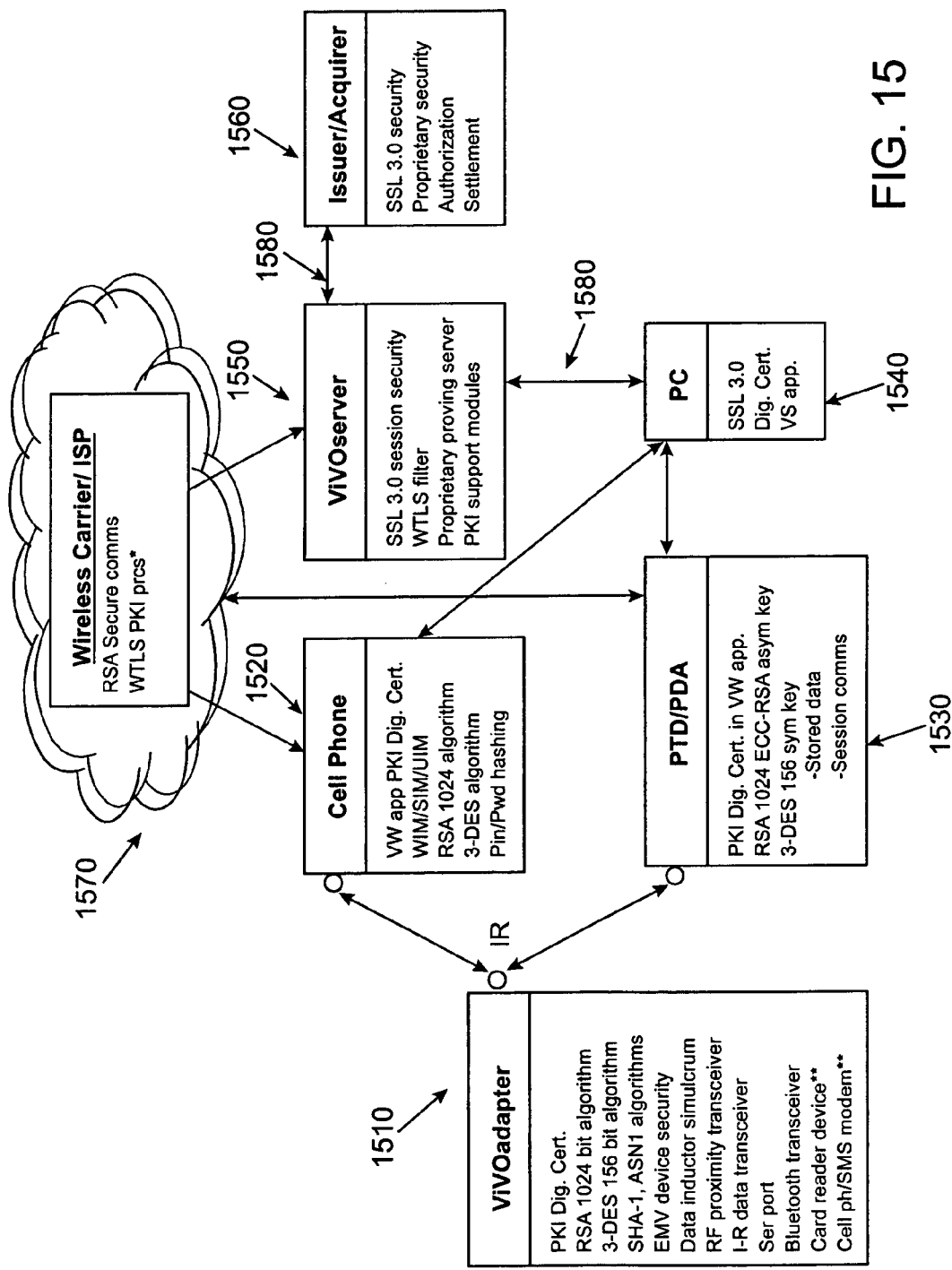
FIG. 15 is a simplified component diagram of physical devices and systems utilized to implement an embodiment of an adaptor in accordance with the present invention.
Figure 16:
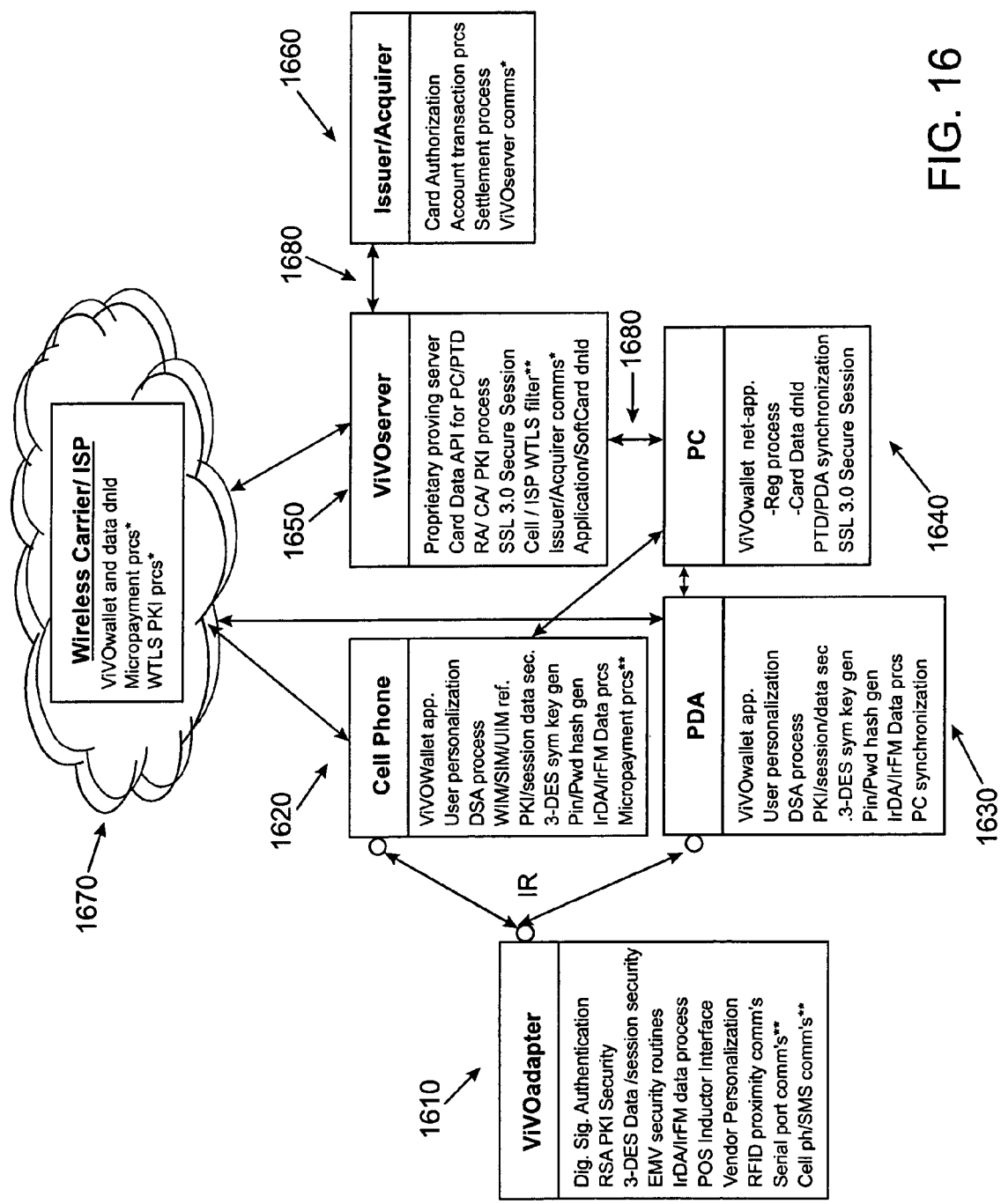
FIG. 16 is a simplified functional diagram of physical devices and systems utilized to implement the embodiment of FIG. 15.

FIG. 15 is a component diagram and FIG. 16 is a functional diagram of the physical devices and systems that will be utilized to implement the present invention that integrates PTD 1620, 1630 with the ViVOwallet financial management application, wireless carrier/ISP data communications network 1670, internet-based ViVOserver 1650, internet-based user's PC 1640, and the merchant's ViVOadapter 1610 modified POS system. The ViVOadapter 1610 may communicate with the RF proximity chip card via inductive coupled RF 14443 type A or type B or 15693 protocols, or other type of transceiver, and with the cell phone 1620 and personal digital assistant (PDA) 1630 via IR, IEEE 802.11(a)(b) or (g), SMS or the wireless carrier/ISP network 1670. The PTD may also communicate via direct cable with the user's PC 1640 for the ViVOwallet and other electronic wallet synchronization purposes and for secure network transactions described herein. The user's PC 1640 may communicate via the internet 1680 with the ViVOserver 1650. The ViVOserver may communicate with the Card Issuer/Acquirer 1660 via the internet 1680 or the cellular/wireless ISP network 1670. The PC based ViVOwallet program may communicate with the ViVOadapter 1610 via the internet and the wireless carrier/ISP network 1670. The ViVOadapter may transmit user's card data described herein to the magnetic card swipe or insert acceptance systems described herein, and may also transmit the data directly to the user's PTD device as described herein.

A benefit of this functional design is the potential integration of RF proximity chip card data communications, IR, and RF transceiver equipment such as IEEE 802.11(a)(b) or (g) and cellular/wireless ISP networks and wired networks into a single device that is substantially permanently installed in the legacy magnetic stripe POS card acceptance systems.

A benefit of this transaction process is the ability of the user to effect a "card-present" financial transaction via near-proximity infrared or by wireless carrier/ISP networks and without presentation of the actual magnetic card. This reduced risk transaction is effected via the transaction and data management security and authentication protocols and procedures enabled by an intelligent transaction device. The "card-present" transaction will result in lower risk assignment by the card issuers and resultant lower transaction fees and merchant qualification.

Another benefit of this transaction process is the capability of the ViVOadapter to temporarily store/cache the magnetic card data introduced to the POS magnetic card reader device and then transmit this data to the user's PTD via infrared, 802.11(a)(b) or (g), and RF proximity 14443 type A and B and 15693 media. Of course, mutual authentication between card data and the user's PTD is required to ensure only magnetic card data assigned by the issuer to the user will be captured and transmitted to the use's PTD via normal secure communications methods. Alternatively, the captured magnetic card data will be transmitted via wireless carrier/ISP, SMS, and internet for installation into the user's PTD device, or for transactions.

Another benefit of this transaction process is the aggregation of the user's magnetic stripe cards via their PTD and home PC. This aggregation will enable greater convenience and greater security achieved through card data encryption measures and by not transporting the physical cards.

Of course, many other configurations of the ViVOadapter enabled equipment are contemplated by the present invention. For example, any PTD device with wireless network capabilities and an integrated infrared communications device will be used with the ViVOwallet application to communicate with the ViVOadapter. Further, a user's mobile PC system with internet access and integrated infrared device will be used in similar manner to the PTD, in addition to the ability of the user to effect a transaction by the ViVOwallet based PC via the internet and wireless carrier/ISP.

Additionally, the ViVOadapter may be placed on the home/office user's PC for online purchases with the RF proximity chip card and PTD IR, RF, Bluetooth 802.11(b) and other communications media described herein. In this embodiment, the user will present the RF card or PTD with ViVOwallet application to the ViVOadapter and the secure data will be transferred to the PC ViVOwallet application for secure transmission to the internet-based purchaser, thereby effecting a secure transaction. A benefit of this novel application is the greater security of the RF proximity chip card that is more resistant to fraud and tampering than the standard magnetic strip credit/debit/ATM/pre-pay/loyalty/member/ID card. This will result in lower transaction risks and associated reduction in transaction processing fees.

Further, PTD-based financial applications exist that are similar to the ViVOwallet financial management application and are capable of communications with the ViVOadapter via the infrared component.

Alternate applications are also contemplated to implement the transaction process with the ViVOwallet financial application remotely located on the wireless carrier/ISP server and/or the ViVOserver and remotely controlled by the buyer's cell phone or PTD.

An embodiment of a method for importing information from a magnetic stripe card into a personal trusted device comprises providing a magnetic stripe card reader having a slot and a magnetic head in magnetic communication with the slot. An adaptor structure is provided having a transceiver configured to transmit a signal to a personal trusted device, a memory in communication with the transceiver, and a simulacrum including an inductor. The simulacrum is disposed substantially permanently within the slot such that the inductor is aligned with the magnetic reader head, the simulacrum sufficiently narrow to allow a magnetic stripe card to access the slot and the magnetic head while the simulacrum is present within the slot. A magnetic stripe card is swiped through the slot such that information on the magnetic stripe card is read by at least one of the inductor and the magnetic head. The information is stored in the memory, and the information is transmitted from the adaptor to the personal trusted device utilizing the transceiver.

An embodiment of a method for communicating information from one PTD to another comprises providing a magnetic stripe card reader having a slot and a magnetic head in magnetic communication with the slot. An adaptor structure is provided comprising a transceiver configured to receive a first signal from a first personal trusted device and to transmit a second signal to a second personal trusted device, a memory in communication with the transceiver, and a simulacrum including an inductor. The simulacrum is disposed substantially permanently within the slot such that the inductor is aligned with the magnetic reader head, the simulacrum sufficiently narrow to allow a magnetic stripe card to access the slot and the magnetic head while the simulacrum is present within the slot. Information is transmitted from the first personal trusted device to the memory through the transceiver. The information is stored in the memory, and the information is transmitted from the memory to the second personal trusted device utilizing the transceiver.

Given the above detailed description of the present invention and the variety of embodiments described therein, these equivalents and alternatives along with the understood obvious changes and modifications are intended to be included within the scope of the present invention.

What is claimed is:

1. A method for importing information from a magnetic stripe card into a personal trusted device, the method comprising:
   providing an adaptor structure comprising,
      a transceiver configured to transmit a signal to a personal trusted device,
      a memory in communication with the transceiver, and
      a simulacrum disposed within a slot of a magnetic stripe card reader and in magnetic communication with a magnetic reader head of the magnetic stripe card reader;
   reading information from a magnetic stripe card by the magnetic card reader head;
   storing the information in the memory;
   transmitting the information to a remote data repository;
   encrypting the information for the personal trusted device to receive a separate message including an encryption key allowing access to the information;
   causing the encrypted information to be communicated from the transceiver to the
   personal trusted device in response to an authorization signal received from the remote data repository.

2. The method of claim 1 wherein the simulacrum is disposed within the slot to allow the magnetic stripe card to access the slot and the magnetic head, and the information on the magnetic stripe card is read by the magnetic reader head.

3. The method of claim 1 further comprising providing the adaptor having a second magnetic reader head in communication with the memory, and the information on the magnetic stripe card is read by the second magnetic reader head.

4. The method of claim 1 wherein the simulacrum is disposed within the slot to allow the magnetic stripe card to access the slot and the magnetic head, and the information on the magnetic strip card is read by the simulacrum.

5. The method of claim 1 wherein the information is transmitted from the adaptor to the personal trusted device utilizing a wireless format selected from the group consisting of IrDa version 2.1 or greater, Consumer IR, ViVOtech proprietary IR, IEEE 802.11(a), IEEE 802.11(b), IEEE 802.11(g) and WiFi standards.

6. The method of claim 1 wherein the information is transmitted from the adaptor to the personal trusted device selected from the group consisting of a cellular phone, a personal digital assistant, an RF proximity chip card, and a mobile personal computer having wireless transmission capabilities.

7. A method for importing information from a magnetic stripe card into a personal trusted device, the method comprising:
   providing an adaptor structure comprising,
      a transceiver configured to transmit a signal to a personal trusted device,
      a memory in communication with the transceiver, and
      a simulacrum disposed within a slot of a magnetic stripe card reader and in magnetic communication with a magnetic reader head of the magnetic stripe card reader;
   reading information from a magnetic stripe card by the magnetic card reader head;
   storing the information in the memory;
   transmitting the information to a remote data repository;

transmitting data from the adaptor to a personal trusted device in response to an authorization signal received from the remote repository, wherein the data comprises a cryptographic key enabling decryption of a separate message containing the information communicated to the personal trusted device; and causing the encrypted information to be communicated to the personal trusted device.

8. The method of claim 7 wherein the separate message is communicated from the remote data repository directly to a transceiver of the personal trusted device.

9. A method for disabling a magnetic stripe card comprising:

providing a magnetic stripe card reader having a slot and a magnetic head in magnetic communication with the slot;

providing an adaptor structure comprising,
 a transceiver configured to transmit a signal to a personal trusted device;
 a memory in communication with the transceiver, and
 a simulacrum including an inductor;

disposing the simulacrum substantially permanently within the slot such that the inductor is aligned with the magnetic reader head, the simulacrum sufficiently narrow to allow a magnetic stripe card to access the slot and the magnetic head while the simulacrum is present within the slot;

swiping a magnetic stripe card through the slot for reading information on the magnetic card by the magnetic head;

communicating the information to a remote data repository;

receiving from the remote data repository a signal indicating invalidity of the magnetic stripe card;

communicating the signal to the adaptor; and in response to the signal, causing the inductor generate an electro-magnetic field of sufficient strength to alter at least one bit of data stored on a magnetic stripe of the magnetic stripe card.

10. The method of claim 9 wherein the remote data repository is administered by an issuer of the magnetic stripe card.

11. The method of claim 9 wherein the remote data repository is administered by other than an issuer of the magnetic stripe card.

12. The method of claim 9 wherein the information is communicated to the remote data repository through a wired connection of the magnetic stripe card reader.

13. The method of claim 9 wherein the information is communicated to the remote data repository through a wireless connection.

14. The method of claim 9 wherein receipt of the signal from the remote data repository results in an instruction for the user to reswipe the magnetic card through the slot, whereupon data on the magnetic stripe is altered.

15. The method of claim 9 wherein the electromagnetic field is generated having a strength of at least about 2,500 oersteds.

16. A method for communicating information to a PTD, the method comprising:

providing a magnetic stripe card reader having a slot and a magnetic head in magnetic communication with the slot;

providing an adaptor structure comprising,
 a transceiver configured to receive a first signal from a source and to transmit a second signal to a personal trusted device, and
 a memory in communication with the transceiver, communicating information received at the transceiver from the source to memory, the information selected from the group comprising a gift certificate, an instrument, a decryption key, a financial management software application, and magnetic stripe card data;

storing the information in the memory;

transmitting the information to a remote data repository;

encrypting the information such that the personal trusted device may subsequently receive a separate message including an encryption key allowing access to the information; and transmitting the encrypted information from the memory to the personal trusted device utilizing the transceiver in response to an authorization signal received from the remote data repository.

17. The method of claim 16 wherein the information is transmitted from the adaptor to the personal trusted device utilizing a wireless format selected from the group consisting of IrDa version 2.1 or greater, Consumer IR, ViVOtech proprietary IR, IEEE 802.11(a), IEEE 802.11(b), IEEE 802.11(g) and WiFi standards.

18. The method of claim 16 wherein the information is communicated to the adaptor from second personal trusted device.

19. The method of claim 16 wherein the information is communicated to the adaptor from a merchant network.

20. The method of claim 16 wherein the adaptor structure further comprises a simulacrum including an inductor, the method further comprising:

disposing the simulacrum substantially permanently within the slot such that the inductor is aligned with the magnetic reader head, the simulacrum sufficiently narrow to allow a magnetic stripe card to access the slot and the magnetic head while the simulacrum is present within the slot; and transmitting the information from the memory to the magnetic head through the inductor for communicating the information to the remote data repository through a wired connection of the magnetic stripe card reader.

21. The method of claim 16 wherein the information is communicated to the remote data repository through a wireless medium.

* * * * *